United States Patent
Itagaki et al.

(10) Patent No.: US 9,576,341 B2
(45) Date of Patent: Feb. 21, 2017

(54) IMAGE-PROCESSING SYSTEM, IMAGING APPARATUS AND IMAGE-PROCESSING METHOD

(71) Applicant: RICOH IMAGING COMPANY, LTD., Tokyo (JP)

(72) Inventors: Shusei Itagaki, Tokyo (JP); Masakazu Terauchi, Tochigi (JP); Masashi Miyata, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/524,314

(22) Filed: Oct. 27, 2014

(65) Prior Publication Data

US 2015/0117792 A1    Apr. 30, 2015

(30) Foreign Application Priority Data

Oct. 30, 2013 (JP) .................................. 2013-225896
Oct. 30, 2013 (JP) .................................. 2013-226023

(51) Int. Cl.
G06T 5/00 (2006.01)

(52) U.S. Cl.
CPC ................. *G06T 5/00* (2013.01); *G06T 5/001* (2013.01); *G06T 2207/10004* (2013.01); *G06T 2207/10024* (2013.01); *G06T 2207/20032* (2013.01); *G06T 2207/20221* (2013.01)

(58) Field of Classification Search
CPC . H04N 9/75; G06T 11/60; G06T 2207/20221; G06T 2207/10024; G06T 5/00; G06T 5/001; G06T 5/50
See application file for complete search history.

(56) References Cited

U.S. PATENT DOCUMENTS

| | | | | |
|---|---|---|---|---|
| 6,323,934 B1 * | 11/2001 | Enomoto | ............... | G06T 5/006 355/32 |
| 7,656,437 B2 | 2/2010 | Yamada et al. | | |
| 8,194,993 B1 * | 6/2012 | Chen | ...................... | G06T 5/006 348/231.6 |
| 8,542,287 B2 * | 9/2013 | Griffith | ............... | H04N 5/2251 348/218.1 |
| 8,848,066 B2 * | 9/2014 | Porter | ..................... | G06K 9/34 348/157 |

(Continued)

FOREIGN PATENT DOCUMENTS

JP    2006-014261    1/2006

*Primary Examiner* — Jingge Wu
(74) *Attorney, Agent, or Firm* — Greenblum & Bernstein, P.L.C.

(57) ABSTRACT

An image-processing system including an image processor and a correction processor is provided. The imaging processor obtains a captured image. The correction processor produces a corrected image by correcting an aberration that emerges in the captured image. The correction processor produces: at least one or more processed images obtained by applying different processes to the captured image; a masking image by applying a predetermined process to one of the captured images or the at least one or more processed images; a composite image by synthesizing the masking image and either of the captured image or the at least one or more processed images, which are not used when producing the masking image; and the corrected image by synthesizing the composite image and the captured image.

11 Claims, 27 Drawing Sheets

(56) References Cited

U.S. PATENT DOCUMENTS

| | | | |
|---|---|---|---|
| 2004/0190786 A1* | 9/2004 | Thakur | H04N 1/4092 382/254 |
| 2005/0100802 A1* | 5/2005 | Callan | G03F 1/144 430/5 |
| 2008/0088793 A1* | 4/2008 | Sverdrup | B29D 11/00009 351/159.73 |
| 2009/0033755 A1* | 2/2009 | Friedhoff | G06T 5/007 348/222.1 |
| 2010/0142805 A1* | 6/2010 | Maxwell | G06K 9/346 382/164 |
| 2010/0318467 A1* | 12/2010 | Porter | G06K 9/34 705/51 |
| 2012/0014599 A1* | 1/2012 | Kano | G06T 5/006 382/167 |
| 2014/0079333 A1* | 3/2014 | Hirai | H04N 5/23235 382/255 |
| 2014/0133779 A1* | 5/2014 | Funabashi | G06T 11/60 382/283 |
| 2014/0300687 A1* | 10/2014 | Gillard | G06T 15/20 348/36 |
| 2015/0271522 A1* | 9/2015 | Panahpour Tehrani | H04N 19/597 375/240.12 |

* cited by examiner

S1 ORIGINAL IMAGE

S22 DETECT USING CHROMATIC INFORMATION

S23 MEDIAN FILTER

S24 LPF

S25 BINARIZATION

S32 EDGE INFORMATION

S33 GAMMA CORRECTION

S41 BINARIZE TO DELIMIT SATURATED AREA

S42 EDGE INFORMATION OF SATURATED AREA

S5 OR

S6 LPF

S7 BINARIZATION

S8 AREA THAT SATISFIES BOTH EDGE INFORMATION
AND CHROMATIC INFORMATION

S9 LPF

S201 CAPTURED IMAGE

S221 CORRECTION IMAGE

S203 MASKING IMAGE

S204 MASKING IMAGE APPLIED TO
CORRECTION IMAGE

S205 COMPOSITE IMAGE

S311 CORRECTION IMAGE

S312 MASKING IMAGE

S322 SATURATION REDUCED IMAGE

S334 MASKING IMAGE APPLIED TO
SATURATION REDUCED IMAGE

S335 COMPOSITE IMAGE

S414 MASKING IMAGE APPLIED TO
CORRECTION IMAGE

S416 COMPOSITE IMAGE

IMAGE-PROCESSING SYSTEM, IMAGING APPARATUS AND IMAGE-PROCESSING METHOD

BACKGROUND OF THE INVENTION

1. Field of the Invention

The present invention relates to an image-processing system, imaging apparatus and image-processing method that are capable of correcting aberrations.

2. Description of the Related Art

An imaging apparatus which is capable of suppressing fringes caused by chromatic aberration that emerge when processing image signals from an image sensor. The imaging apparatus calculates a difference of luminance between a target pixel and surrounding pixels. Further, the imaging apparatus detects the fringes with reference to the above calculated luminance difference and corrects the fringes caused by the chromatic aberration (see Japanese Unexamined Patent Publication No. 2006-014261).

SUMMARY OF THE INVENTION

However, a fringe may exist even when a substantial luminance difference between a target pixel and its surrounding pixels goes undetected. In such case, chromatic aberration is undetectable, and as a result, such chromatic aberration may not be corrected. Further, when there is insufficient aberration detection, the quality of the image will deteriorate if a smear appears in the corrected image.

Accordingly, primary aspect of the present invention is to provide an image-processing system, imaging apparatus and image-processing method that can detect and correct a chromatic aberration accurately.

Further, another aspect of the present invention is to provide an image-processing system, imaging apparatus and image-processing method that can correct the chromatic aberration without leaving a correction smear.

According to one aspect of the present invention, an image-processing system including an image processor and a correction processor is provided.

The imaging processor obtains a captured image. The correction processor produces a corrected image by correcting an aberration that emerges in the captured image. The correction processor produces: at least one or more processed images by applying different processes to the captured image; a masking image by applying a predetermined process to one of either the captured image or the at least one or more processed images; a composite image by synthesizing the masking image and either of the captured image or the at least one or more processed images, which are not used when producing the masking image; and the corrected image by synthesizing the composite image and the captured image.

According to another aspect of the invention, an image-processing system including an imaging processor and a correction processor is provided.

The imaging processor obtains a captured image via a photographic lens. The correction processor produces a corrected image by correcting an aberration that emerges in the captured image. The correction processor produces: at least one or more processed images by applying different processes to the captured image with reference to specific design data of the photographic lens; a masking image by applying a predetermined process to one of either the captured image or the at least one or more processed images; a composite image by synthesizing the masking image and either of the captured image or the at least one or more processed images, which are not used in producing the masking image; and the corrected image by synthesizing the composite image and the captured image.

BRIEF DESCRIPTION OF THE DRAWINGS

The objects and advantages of the present invention will be better understood from the following description with references to the accompanying drawings in which.

DESCRIPTION OF THE PREFERRED EMBODIMENTS

Figure 1:
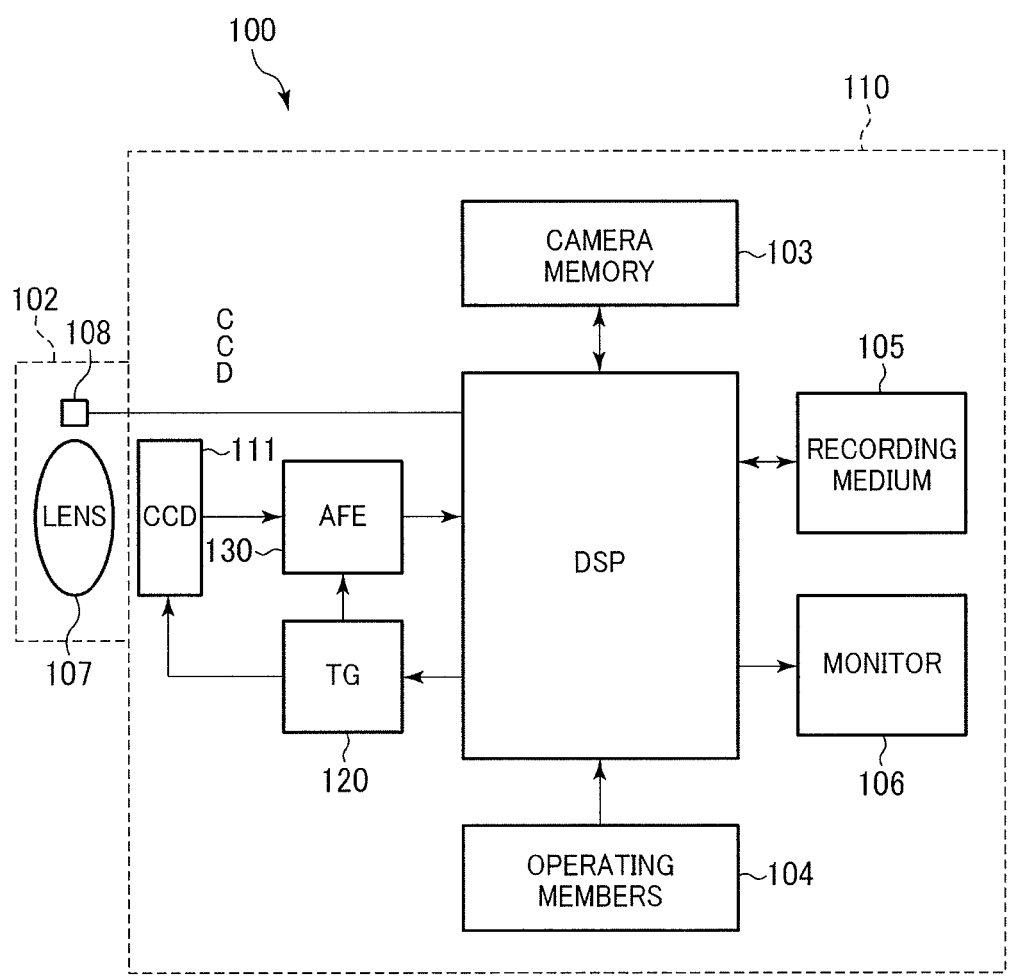
FIG. 1 is a block diagram schematically illustrating an image-processing system and an imaging apparatus, in which an embodiment of the present invention is applied.

The present invention is described below with references to the embodiments shown in the drawings.

FIG. 1 is a block diagram of a digital camera 100 or an imaging apparatus, in which an image-processing system of a first embodiment of the present invention is applied. The configurations of the digital camera 100 will be described with reference to FIG. 1.

The digital camera 100 may include a DSP 101, which may work as an aberration correction processor, a CCD 111 as an image sensor, an interchangeable photographic lens 102, a timing generator (TG) 120, an analog front-end (AFE) 130, a camera memory 103, operating members 104, a recording medium 105 and a monitor 106.

The photographic lens 102 is provided with a multiple lens system 107 and a lens memory 108. The photographic lens 102 produces images of objects on the CCD 111 via the multiple lens system 107. The photographic lens 102 includes chromatic aberration, which may cause a fringe. The lens memory 108 stores design data or characteristics of the photographic lens.

The DSP 101, CCD 111, timing generator 120, AFE 130, camera memory 103, operating members 104, recording medium 105 and monitor 106 are provided in a camera body 110. The CCD 111 captures an object image, which is projected on the CCD 111 through the photographic lens 102, in accordance with exposure control signals from the timing generator 120. The image signals of the object image captured by the CCD 111 are output, then processed in the AFE 130 and fed to the DSP 101. The DSP 101 further processes the image signals and produces a digital image and an image data file of the image signals. The digital image is displayed on the monitor 106 and the image data file is stored in the recording medium 105. The DSP 101 may perform a first aberration correction process, which will be detailed later.

The recording medium 105, such as an SD card (registered trademark) is detachably connected to the digital camera 100 and stores image data files.

The monitor 106, such as an LCD, is provided on the backside of the digital camera 100 and is capable of displaying an image.

The camera memory 103 stores firmware of the DSP 101 and image data files. The camera memory 103 may also be used as virtual memory when executing a process in the DSP 101.

The operating members 104 may include a shutter-release button, which reacts with two steps, a D pad, a push switch and the like. The operating members 104 send signals to the DSP 101 when they are operated by a user. The DSP 101 may operate according to signals received from the operating members 104.

Figure 2:
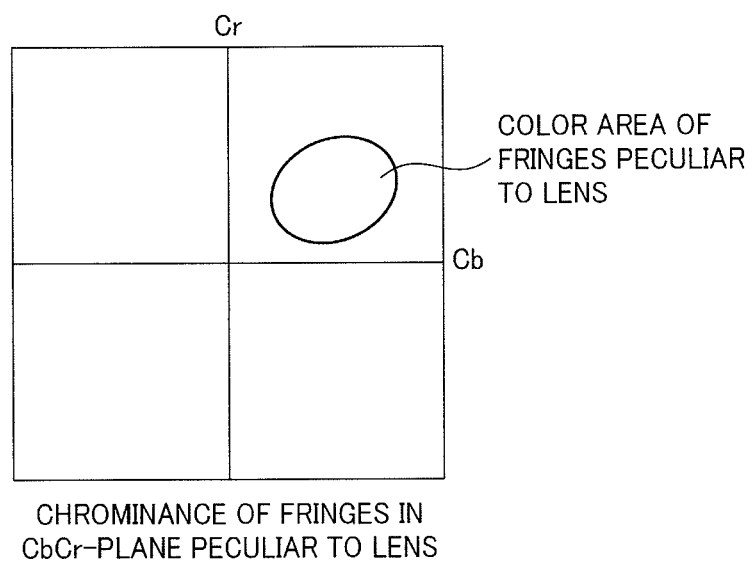
FIG. 2 is a graph showing an aberration area.

The photographic lens 102 has inherent chromatic aberration, which is peculiar to each lens. Namely, the chromatic aberration can be estimated from the lens data. FIG. 2 schematically indicates a color area in a CbCr plane of the YCbCr color space where a fringe or chromatic aberration is probable, based on the lens data. Blue-difference and red-difference chroma components of the above-mentioned fringe are generally located within a particular area of the CbCr plane. Therefore, a color area in the CbCr plane where the fringe due to the chromatic aberration of the lens is probable, can be determined from the lens data. This color area is referred to as a chromatic aberration area in the present application. The DSP 101 calculates this chromatic aberration area from the lens data.

The DSP 101 is also capable of performing the first aberration correction process that corrects or modifies fringes that emerge in a captured image. The first aberration correction process generates two aberration images, in which the fringes are enhanced, from a single captured image by carrying out different processes, and then synthesizes these two aberration images. Further, the first aberration correction process applies a low-pass filter (LPF) to the synthesized or composite image to correct fringes.

Figure 3:
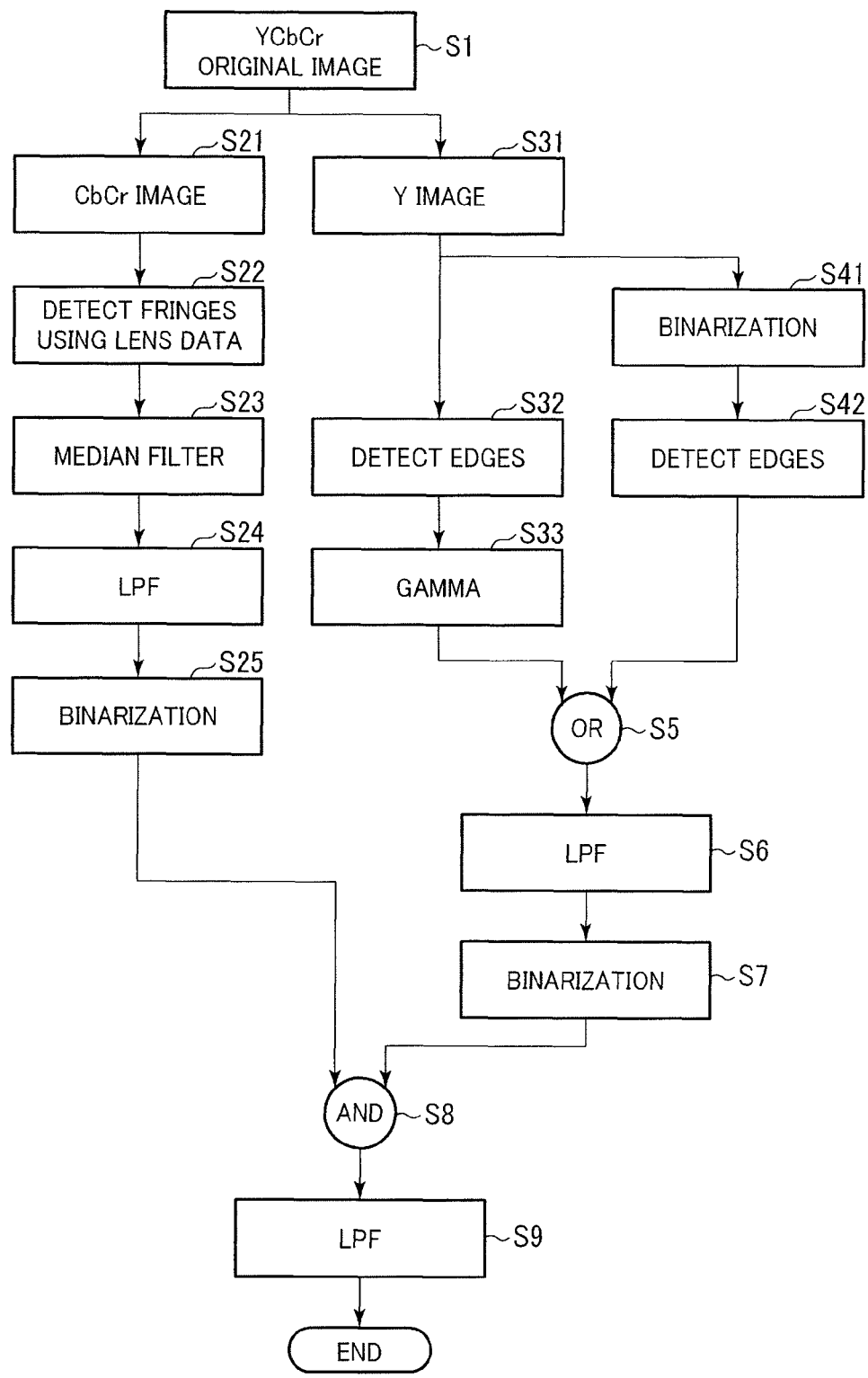
FIG. 3 is a flowchart of an aberration correction process.

Next, with reference to FIG. 3, the detail of the first aberration correction process is explained.

Figure 4:
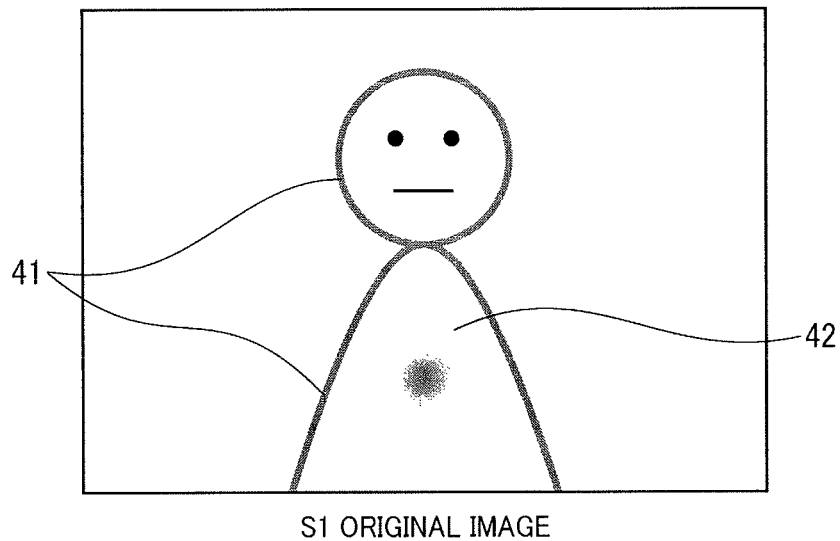
FIG. 4 schematically illustrates an example of a captured image.

In Step S1, an image is captured. An example of the captured image, which is represented in YCbCr format, is schematically illustrated in FIG. 4. In this captured image, fringes 41 emerge along the profile of a human figure. Further, in the middle of the human body, there exists an elliptic pattern 42 having chroma components resembling a fringe. The process then proceeds to Steps S21 and S31.

In Step S21, a Cb—Cr image (a first image) according to Cb—Cr data (first information), which is an image represented in the Cb—Cr color space, is generated from the captured image.

Figure 5:
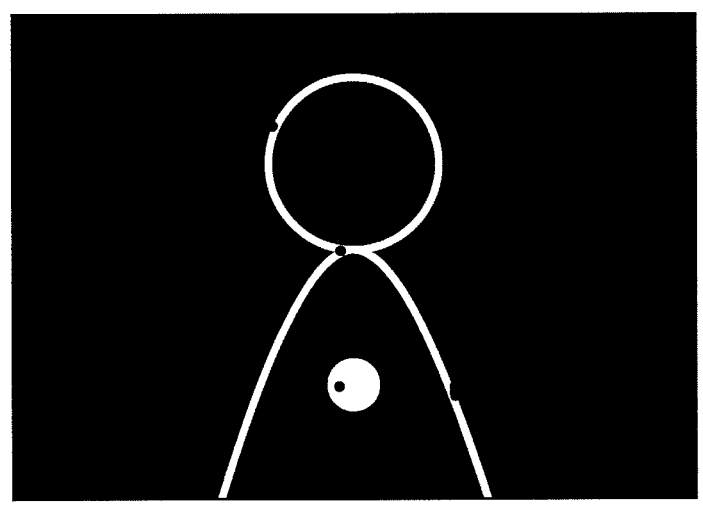
FIG. 5 schematically illustrates an example of a first intermediate correction image.

In Step S22, the lens data is obtained from the photographic lens 102 and the chromatic aberration area is calculated. Thereby, pixels with chromatic information or chromatic components within the chromatic aberration area are detected in the Cb—Cr image. FIG. 5 schematically illustrates a first intermediate correction image, where pixels with the chromatic components within the chromatic aberration area are indicated in white and pixels with the chromatic components outside the chromatic aberration area are indicated in black. In the image illustrated in FIG. 5, only some parts of the fringes 41 and the pattern 42, which are depicted in the captured image of FIG. 4, are represented in white, and the remaining parts are represented in black. Namely, part of the fringes 41 and part of the pattern 42 are detected as a fringe. Here, an area indicated in white is referred to as a first detected area. However, when a fringe overlaps with an imaging subject, chromatic components within an overlapped portion represent a blend of chromatic information of the fringe and the subject. Therefore, in such portion, their chrominance may depart from the inborn chrominance of the fringes and could be positioned outside the chromatic aberration area. An area including such chromatic information emerges as a black dot within the first detected area of the first intermediate correction image. Namely, in the first intermediate correction image, a plurality of black dots emerges within an area corresponding to part of the fringes 41 and the pattern 42 of the captured image. In Step S23, these black dots are eliminated.

Figure 6:
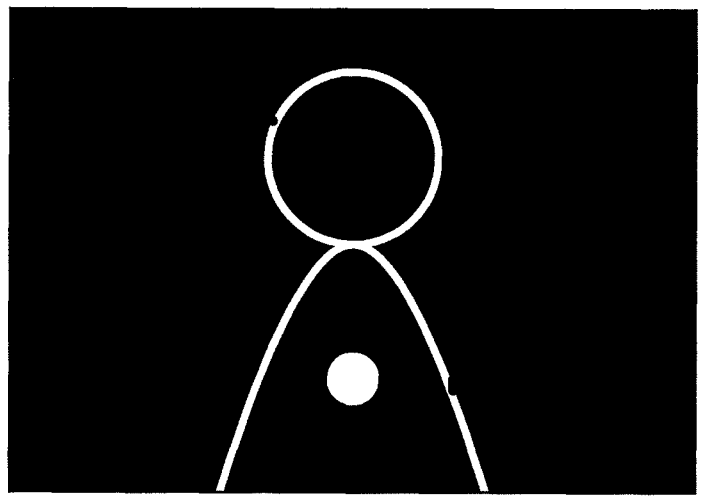
FIG. 6 schematically illustrates an example of a second intermediate correction image.

In Step S23, a median filter is applied to the first intermediate correction image. The median filter is a filter for smoothing an image and removes dot noise. Thereby, a second intermediate correction image, in which the black dot areas that emerged in the first intermediate correction image of FIG. 5 are removed, is obtained. FIG. 6 is an example of the second intermediate correction image.

Figure 7:
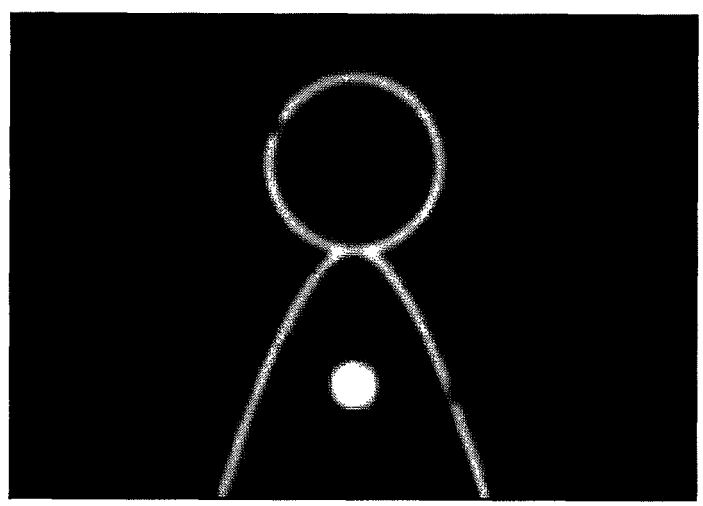
FIG. 7 schematically illustrates an example of a third intermediate correction image.

In Step S24, a low-pass filter (LPF) is applied to the second intermediate correction image so that a third intermediate correction image is generated. In certain cases, a pixel corresponding to a fringe may not be included in the chromatic aberration area when chromatic information of the pixel is slightly different from the fringe chromatic information. Those areas with chromatic information slightly different from those of the fringe chromatic information are detected by applying the low-pass filter. Namely, fringes that emerge in the vicinity of the chromatic aberration area are detected by applying the low-pass filter. An example of the third intermediate correction image is illustrated in FIG. 7.

Figure 8:
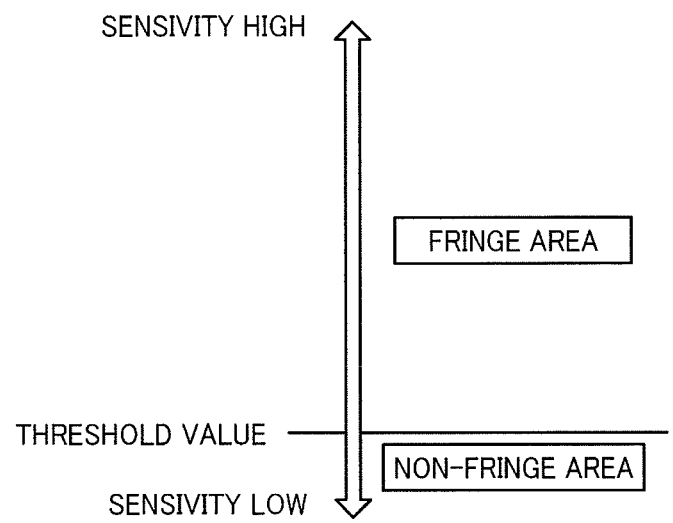
FIG. 8 illustrates the relationship between a threshold value and chrominance.
Figure 9:
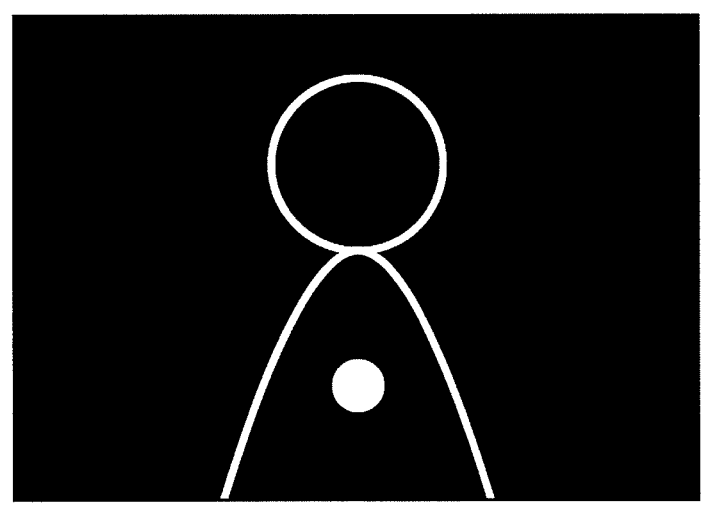
FIG. 9 schematically illustrates an example of a first aberration image.

In Step S25, the chromatic information of the pixels in the third intermediate correction image is binarized under a predetermined threshold value. Namely, a pixel with chromatic information equal to or greater than the threshold value is determined to be a pixel with a fringe, and otherwise without a fringe. Hereinafter, an image generated by this procedure is referred to as a first aberration image. FIG. 8 illustrates the relationship between the threshold value and chromatic information (of either chromatic coordinates). When the threshold value is set lower, an area determined to be a fringe existing area expands and an area determined to be a fringe non-existing area contracts. Further, when the threshold value is set higher, an area determined to be a fringe existing area contracts and an area determined to be a fringe non-existing area expands. By controlling the threshold value, an area determined to be the fringe existing area can be controlled. FIG. 9 is an example of the first aberration image. Pixels with chromatic information equal to or greater than the threshold value are represented in white and pixels with chromatic information less than the threshold value are represented in black. Although the low-pass filter may expand an area determined to be a fringe existing area and could include a fringe non-existing area, a fringe non-existing area may be excluded by the binarization using the threshold value.

By executing Steps S21-S25, areas having a color close to the fringe color are detected.

On the other hand, in Step S31, a Y-image (a second image) representing Y-data of luminance Y of the captured image is produced. A fringe generally occurs in an area where a luminance difference between neighboring pixels is large. Therefore, the process hereinafter detects fringes with reference to the luminance information. The process proceeds to Steps S32 and S41.

Figure 10:
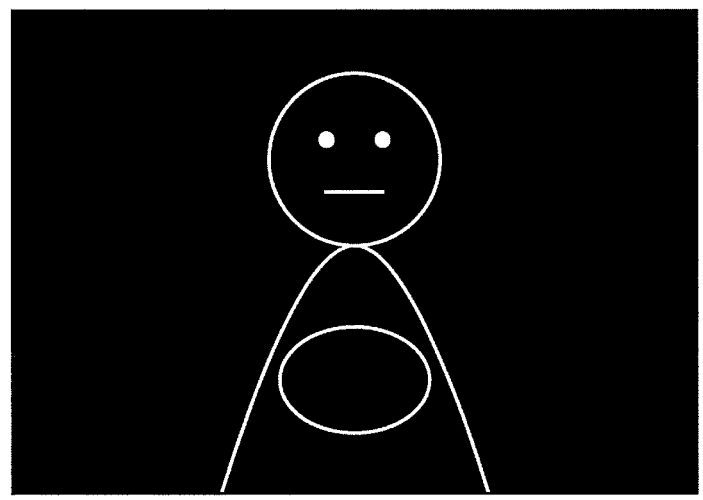
FIG. 10 schematically illustrates an example of a fourth intermediate correction image.

In Step S32, pixels of which the luminance difference between the neighboring pixels is greater or equal to a predetermined value are extracted with reference to the luminance information. Here, a Laplacian operator or a Sobel operator is used to extract pixels including a fringe. Thereby, a fourth intermediate correction image illustrated in FIG. 10 is generated.

Figure 11:
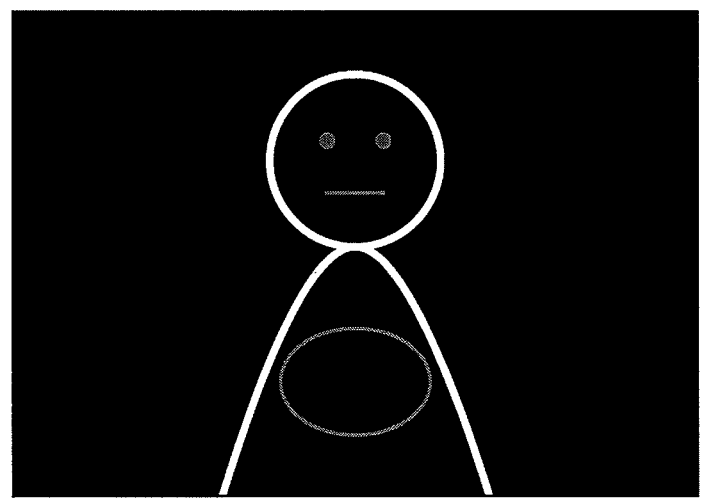
FIG. 11 schematically illustrates an example of a second aberration image.

In Step S33, a non-linear gamma correction is applied to the fourth intermediate correction image. Thereby, the luminance of each pixel with small luminance differences from neighboring pixels is decreased while the luminance of each pixel with large luminance differences from neighboring pixels is increased. In most cases, a fringe does not emerge on a pixel where the luminance differences from the neighboring pixels are small. On the other hand, a fringe tends to emerge on pixels where the luminance differences from the neighboring pixels are large. By applying the non-linear gamma correction, the luminance of a pixel where a fringe is probable is increased while the luminance of a pixel where a fringe is unlikely to exist is decreased. Thereby, a second aberration image, which is illustrated in FIG. 11, is produced.

Accordingly, the pixels having large luminance difference from neighboring pixels are detected via Steps S31-S33.

Figure 12:
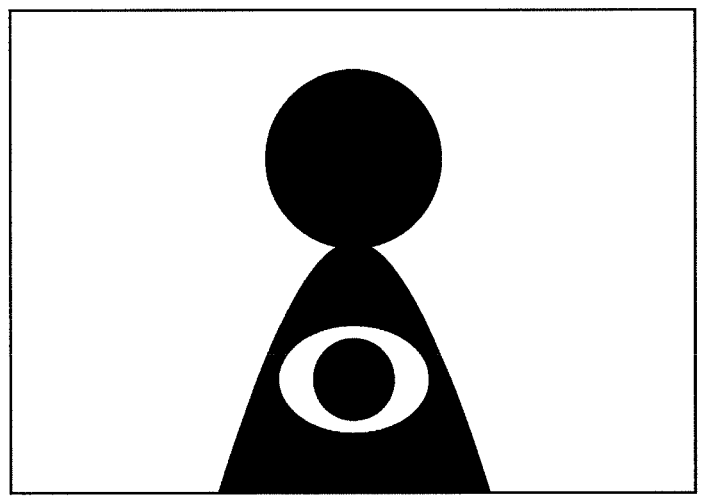
FIG. 12 schematically illustrates an example of a fifth intermediate correction image.

On the other hand, in Step S41, the luminance information included in the Y-image (Y signals) is binarized with reference to a predetermined threshold value. Namely, the edges of saturated areas are detected so that a saturated area and an unsaturated area can be distinguished. An image produced by this procedure is referred to as a third aberration image. Strong fringes tend to emerge on boundaries between saturated and unsaturated areas. Therefore, the edges of the saturated areas are detected by binarization using the predetermined value to exclude the unsaturated areas from the saturated areas. FIG. 12 is a schematic illustration of a fifth intermediate correction image where a white area represents pixels with luminance information greater or equal to the predetermined threshold value and a black area represents pixels with luminance information less than the predetermined threshold value.

Figure 13:
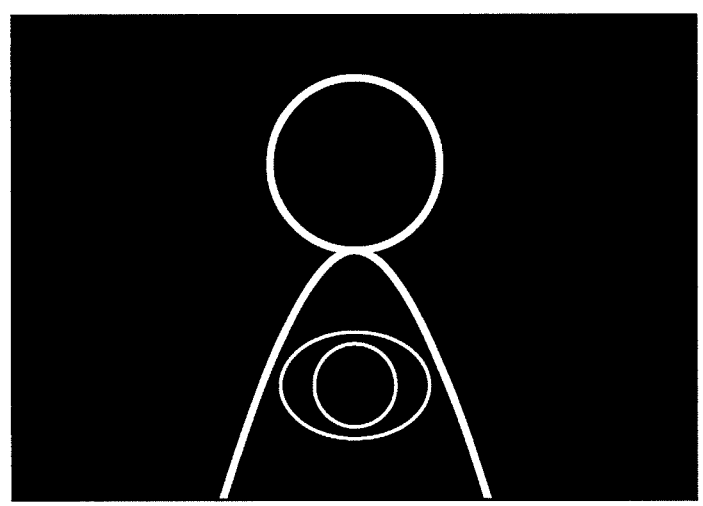
FIG. 13 schematically illustrates an example of a third aberration image.

In the next Step S42, profiles of objects in the fifth intermediate correction image are detected. Thereby, a third aberration image, which is illustrated in FIG. 13, is produced.

Namely, through Steps S41-S42, the boundaries between areas where the luminance information is saturated and unsaturated are detected.

Figure 14:
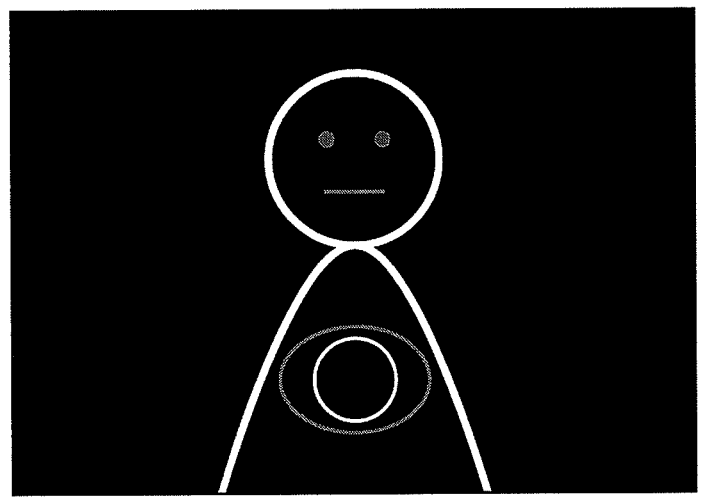
FIG. 14 schematically illustrates an example of a fourth aberration image.

In Step S5, the logical disjunction between the second aberration image and the third aberration image is calculated. Thereby, a fourth aberration image, which is illustrated in FIG. 14, is produced. Detection of areas where the fringes are probable is improved by applying the logical disjunction between the second aberration image, which indicates pixels having a large luminance difference from neighboring pixels, and the third aberration image, which indicates boundaries between saturated and unsaturated areas of the luminance information.

Figure 15:
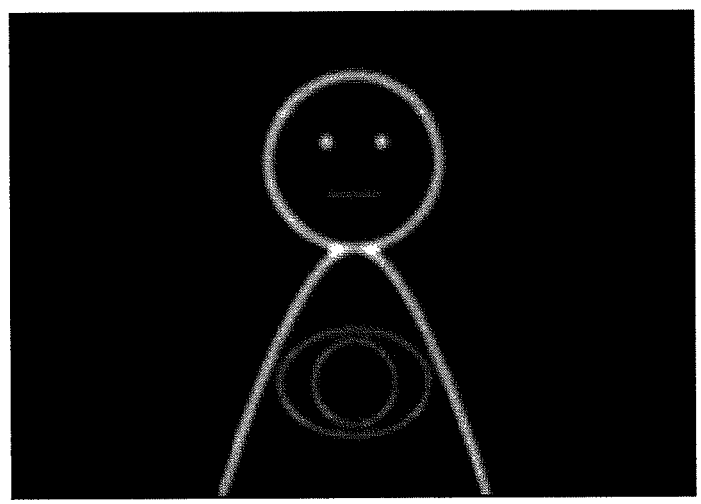
FIG. 15 schematically illustrates an example of a sixth intermediate correction image.

In Step S6, a low-pass filter is applied to the fourth aberration image so that a sixth intermediate correction image, which is illustrated in FIG. 15, is produced. Thereby, boundaries of areas that are determined to include a fringe are blurred.

Figure 16:
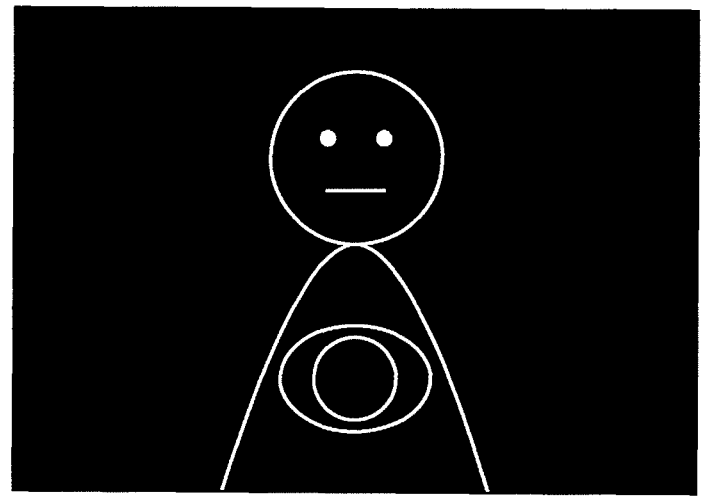
FIG. 16 schematically illustrates an example of a seventh intermediate correction image.
Figure 17:
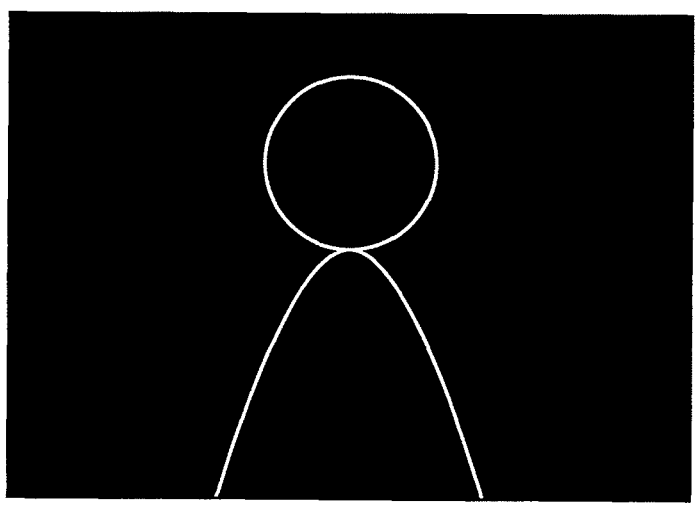
FIG. 17 schematically illustrates an example of an aberration detected image.

In Step S7, the luminance information of each pixel in the sixth intermediate correction image is binarized by a predetermined threshold value so that a seventh intermediate correction image, which is illustrated in FIG. 16, is produced. The width of a fringe that emerges on a captured image depends on the photographic lens 102. The width of fringes to be discovered is set according to the photographic lens 102 by adjusting the threshold value. The higher the threshold value, the narrower the width corresponding to the photographic lens 102; and the lower the threshold value, the thicker the width corresponding to the photographic lens 102.

In Step S8, the logical conjunction between the first aberration image produced in Step S25 and the seventh intermediate correction image produced in Step S7 is calculated to obtain an aberration-detected image.

The areas where the fringe emerges can be detected from the logical conjunction between the first aberration image, which indicates areas having a color close to the fringe, and the seventh intermediate correction image, which indicates areas where fringes are most likely detected by the luminance.

Figure 18:
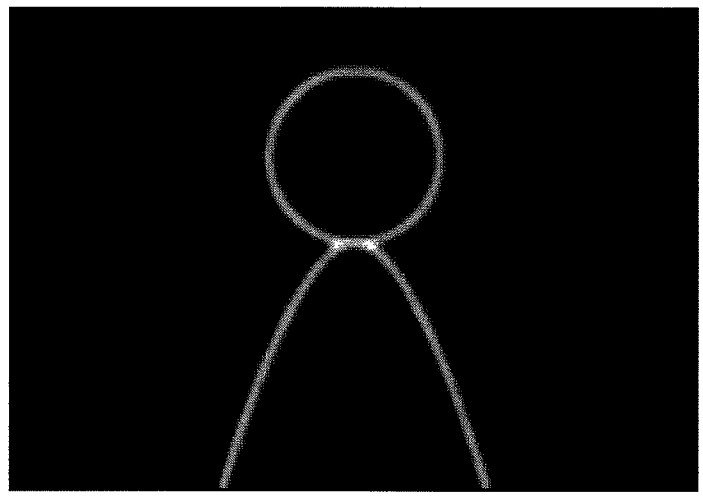
FIG. 18 schematically illustrates an example of an aberration reduced image.

In Step S9, an aberration reduced image is produced by applying a low-pass filter to the aberration detected image. Thereby, boundaries between areas where the fringes emerge and the other areas are blurred. In the aberration detected image, the boundaries between the areas with fringes and the other areas are defined so that when the aberration detected image is synthesized onto the captured image, boundaries between areas modified by the synthesis and unmodified areas stand out. However, if the aberration detected image is synthesized onto the captured image after applying the low-pass filter, the boundaries between areas modified by the synthesis and unmodified areas are blurred to make the boundaries less noticeable. An example of the resulting aberration reduced image is schematically illustrated in FIG. 18.

Accordingly, the fringes are corrected by synthesizing the aberration reduced image onto the captured image.

As described above, according to the present embodiment, the chromatic fringes are precisely detected and corrected from a single captured image.

Note that instead of the binarization of Step S41, gamma correction may be applied to the luminance information of the image to enhance the contrast around the saturated area by selecting a large gamma value. The profiles of objects in the fifth intermediate correction image may be easily detected in Step S42.

Note that when detecting fringes using the first, second and third aberration images, weighting or alpha blending may be applied to one or two of the first, second and third aberration images or to all of the first to third aberration images before applying logical disjunction or logical conjunction.

Next, with reference to FIGS. 19-24, a second embodiment of the present invention is explained. As for components similar to the first embodiment, the same symbol or number is used and their description is omitted. A digital camera 100 of the second embodiment does not carry out the first aberration correction process; a second aberration correction process is carried out instead. The second aberration correction process is explained below.

The DSP 101 plays the roles of an image capturing processor and an image correction processor and carries out the second aberration correction process that corrects the fringes that emerge on a captured image. The second aberration correction process generates two images from a single captured image, produces a masking image from one of the two images, and synthesizes the masking image with the other image to correct the fringes.

Figure 19:
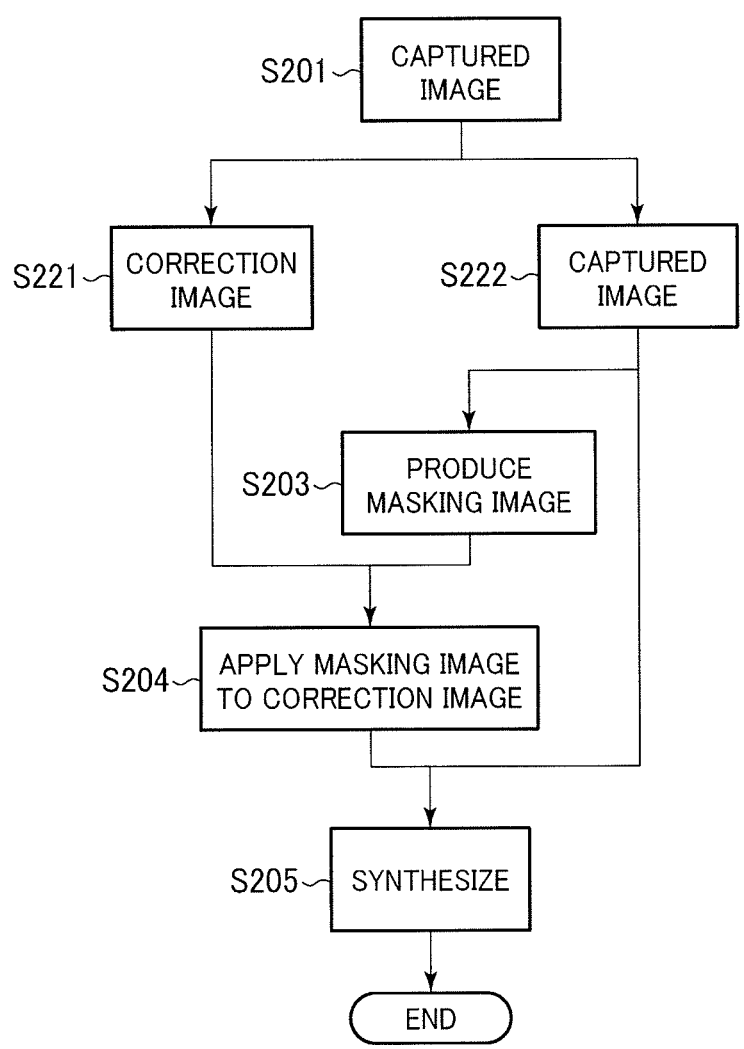
FIG. 19 is a flowchart of a second aberration correction process.

Next, with reference to FIG. 19, the second aberration correction process is explained.

Figure 20:
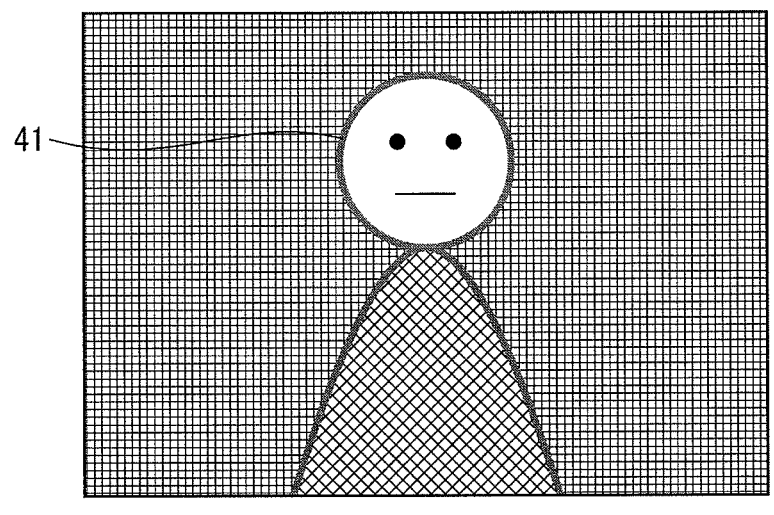
FIG. 20 schematically illustrates another example of a captured image.

In Step S201, an object image, which is referred to as a captured image, is captured. The captured image is schematically illustrated in FIG. 20. Fringes 41 emerge on the outline of a person in the captured image. The process then proceeds to Steps S221 and S222.

Figure 21:
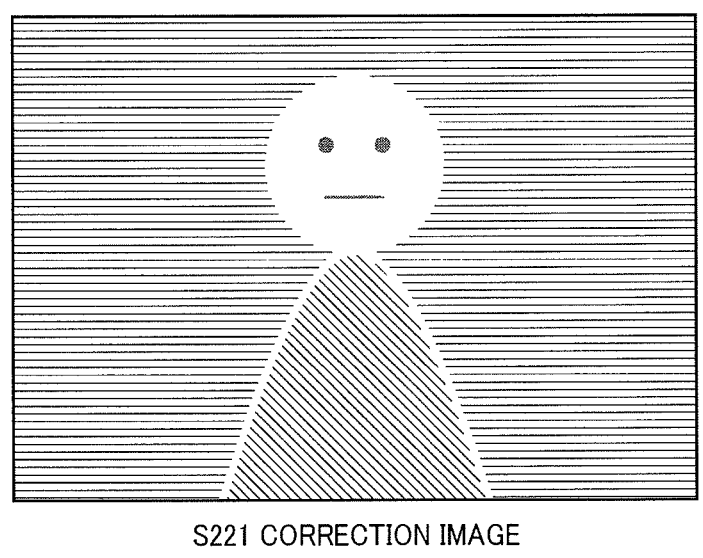
FIG. 21 schematically illustrates an example of a correction image.

In Step S221, a correction image (a first processing image) is produced from the captured image. The correction image is generated by a process that includes a parameter(s) and that is able to suppress the saturation of the chrominance information. Accordingly, the fringes included in the captured image are suppressed. The process may include white balance, color matrix, gamma correction, a process to control the saturation or sharpness, and the like. The values of the parameters are selected to suppress the saturation. For example, the elements of the color matrix are adjusted to suppress color components that are prominent in the fringes. An example of the correction image is schematically illustrated in FIG. 21.

Step S222 is merely to indicate that the captured image is subjected to the following processes, but no process actually takes place in this step.

Figure 22:
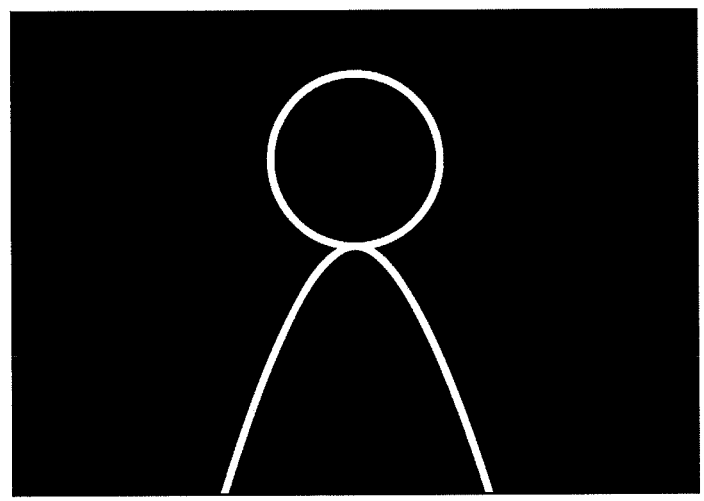
FIG. 22 schematically illustrates an example of a masking image.

In Step S203, the fringes that emerge in the captured image are detected and a masking image (for extracting the fringe areas) that masks areas other than the fringes is produced. The masking image is schematically illustrated in FIG. 22. The masking image may be one of an aberration detected image or an aberration reduced image that are produced in the first aberration correction process.

Figure 23:
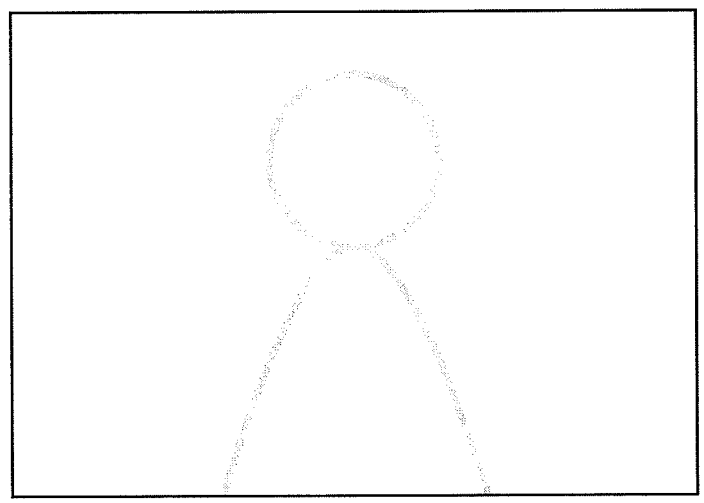
FIG. 23 schematically illustrates an example of a composite image.

In Step S204, the masking image is synthesized with the correction image. Thereby, a composite image, in which only the fringe areas of the correction image are extracted, is produced. This composite image is schematically illustrated in FIG. 23.

Figure 24:
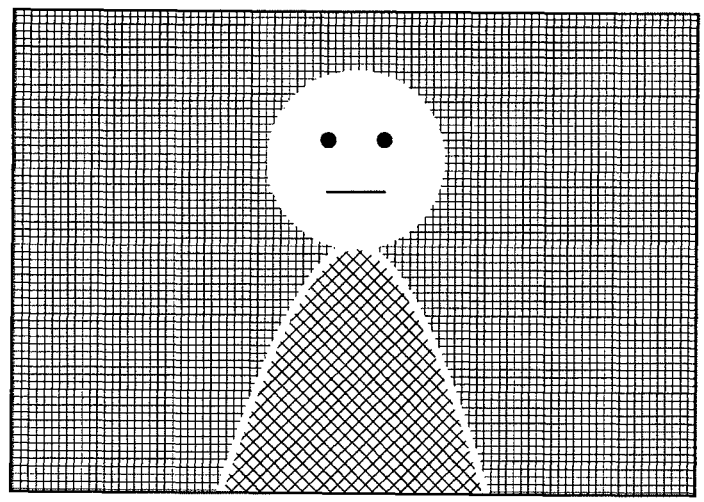
FIG. 24 schematically illustrates an example of a corrected image.

In Step S205, the composite image is synthesized with the captured image. Namely, a corrected image, in which the suppressed fringes are synthesized on the fringe areas of the captured image, is obtained. Thereby, the corrected image where the fringes are suppressed is obtained. The corrected image is schematically illustrated in FIG. 24.

According to the present embodiment, the chromatic fringes are precisely detected and corrected from a single captured image.

Incidentally, when using a process that only suppresses the saturation of the fringe areas, the color of these areas may become darker after the correction. However, in the present embodiment, the saturation of the fringe areas is suppressed and then synthesized with the originally captured image so that the color of the fringe areas is not darkened.

Next, with reference to FIGS. 25-30, a third embodiment of the present invention is explained. The components that are the same as in the first embodiment are not explained, but are referred to by the same reference numbers. The digital camera 100 of the third embodiment does not perform the first aberration correction process; instead a third aberration correction process is carried out. The third aberration correction process will be explained bellow.

The DSP 101 plays the roles of an image capturing processor and an image correction processor and carries out the third aberration correction process that corrects the fringes that emerge on a captured image. The third aberration correction process generates two images from a single captured image, produces a masking image from one of the two images, synthesizes the masking image with the other image to produce a composite image, and further synthesizes the composite image and the original image to correct the fringes.

Figure 25:
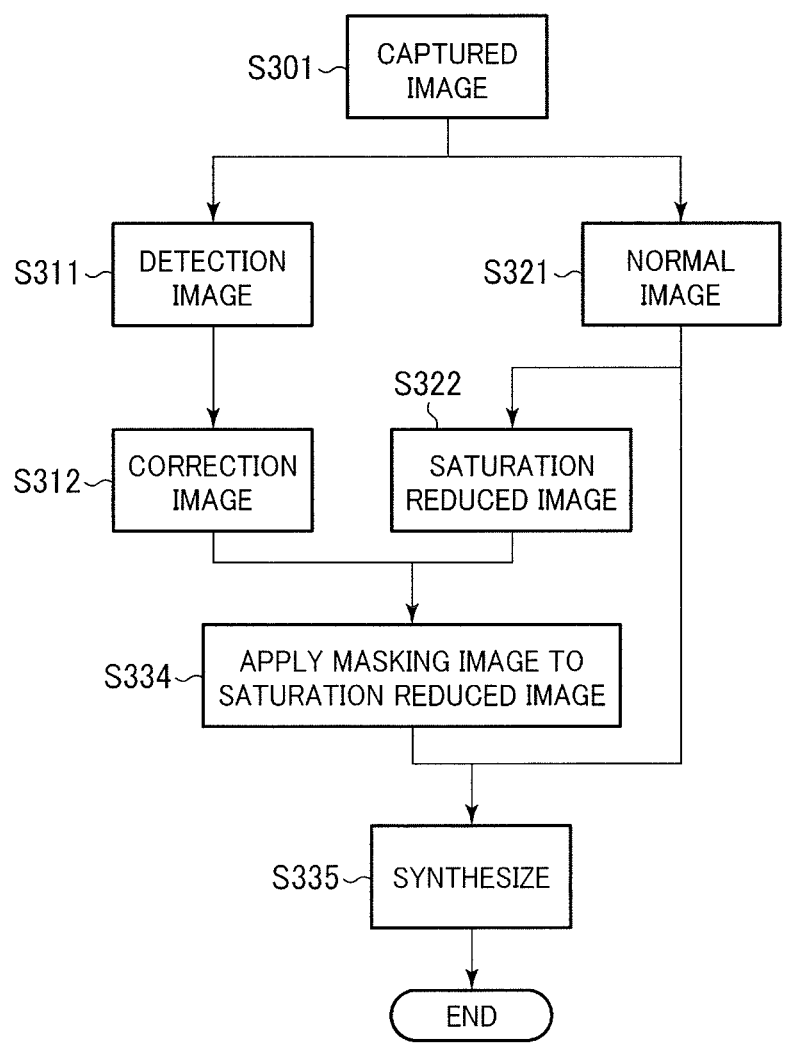
FIG. 25 is a flowchart of a third aberration correction process.

Next, with reference to FIG. 25, the third aberration correction process is explained.

In the first Step S301, an object image, which is referred to as a captured image, is captured. The captured image is schematically illustrated in FIG. 20. Fringes 41 emerge on the outline of a person in the captured image. The process then proceeds to Steps S311 and S321.

Figure 26:
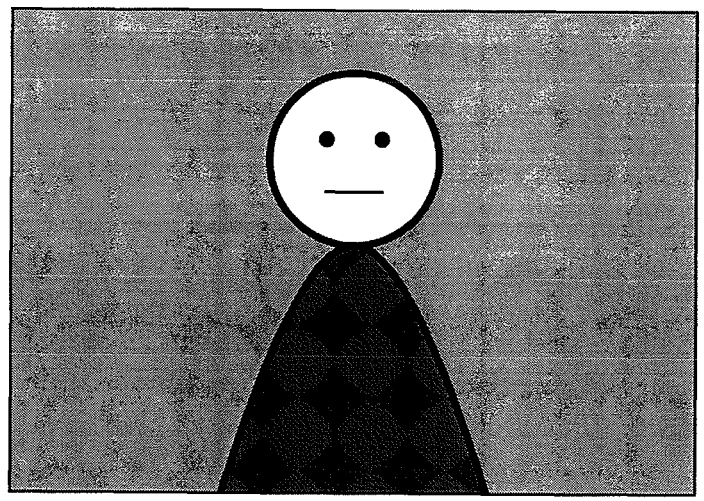
FIG. 26 schematically illustrates an example of a detection image.

In Step S311, a detection image (a second processing image) is produced from the captured image. The detection image is generated by a process that includes a parameter(s) and that helps to detect the fringes. Accordingly, the fringes included in the captured image are enhanced by the process. The process may include white balance, color matrix, gamma correction, a process to control the saturation or sharpness, and the like. The values of the parameters are selected to facilitate the detection of the fringes. For example, the elements of the color matrix are adjusted to increase the saturation of colors within a certain range of wavelengths to enhance the colors that emerge on the fringes. An example of the detection image is schematically illustrated in FIG. 26. The fringes are accurately and effectively detected by enhancing the chromatic saturation within the specific wavelength range and further by determining the saturated areas as fringe areas. Further, a fringe is also more easily determined by increasing the saturation even when the colors of the fringes resemble the color of an actual object.

Figure 27:
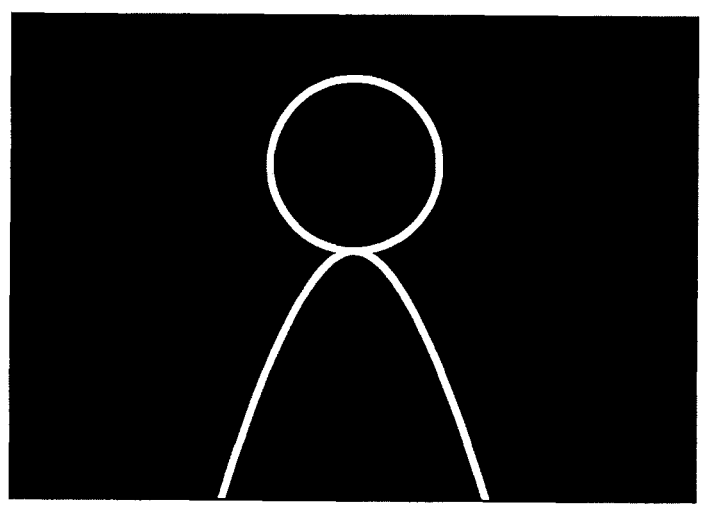
FIG. 27 schematically illustrates an example of a correction image.

In Step S312, the fringes in the detection image are detected and a masking image, from which the fringe areas are extracted, is produced. The masking image is schematically illustrated in FIG. 27. The masking image may be one of an aberration detected image or an aberration reduced image that are produced in the first aberration correction process.

Step S321 is merely to indicate that the captured image is subjected to the following processes, but no process actually takes place in this step.

Figure 28:
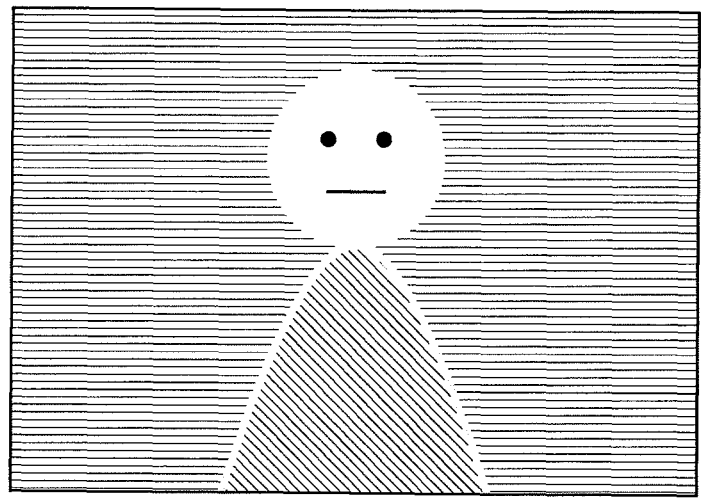
FIG. 28 schematically illustrates an example of a masking image.

In Step S322, a saturation reduced image (a third processed image) is produced from the captured image. The saturation reduced image is an image that is produced by reducing the saturation of the entire captured image. The saturation reduced image is schematically illustrated in FIG. 28.

Figure 29:
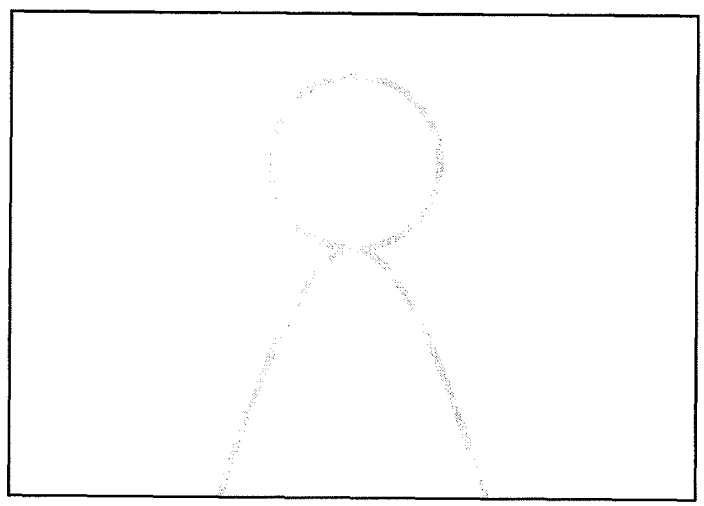
FIG. 29 schematically illustrates an example of a composite image.

In Step S334, the masking image is synthesized with the saturation reduced image. Thereby, a composite image, in which only the fringe areas of the correction image are extracted, is produced. This composite image is schematically illustrated in FIG. 29.

Figure 30:
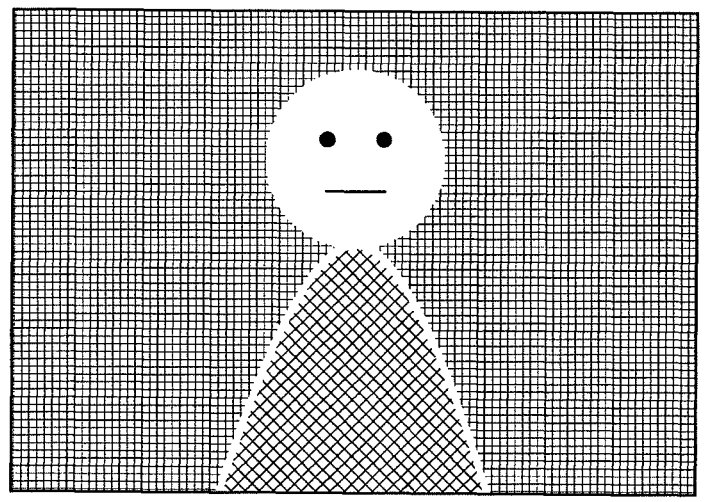
FIG. 30 schematically illustrates an example of a corrected image.

In Step S335, the composite image is synthesized with the captured image. Namely, a corrected image, in which the suppressed fringes are synthesized on the fringe areas of the captured image, is obtained. Thereby, the corrected image where the fringes are suppressed is obtained. The corrected image is schematically illustrated in FIG. 30.

According to the present embodiment, the same effects as the second embodiment are obtained.

Incidentally, the fringes may be accurately and efficiently determined by identifying saturated areas by increasing the saturation of the colors within the certain wavelength range in Step S311. Further, the fringes may also be more easily determined by increasing the saturation when the colors of the fringes resemble the colors of an actual object.

Figure 31:
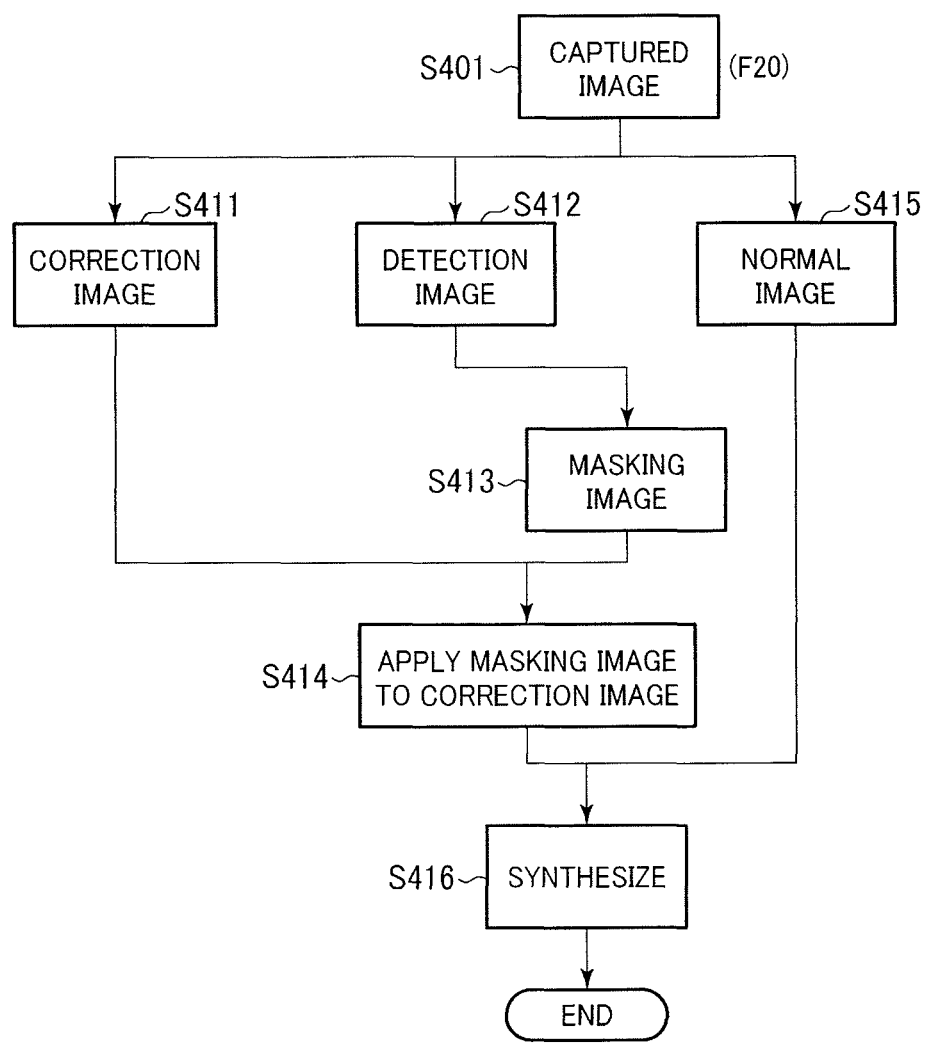
FIG. 31 is a flowchart of a fourth aberration correction process.
Figure 32:
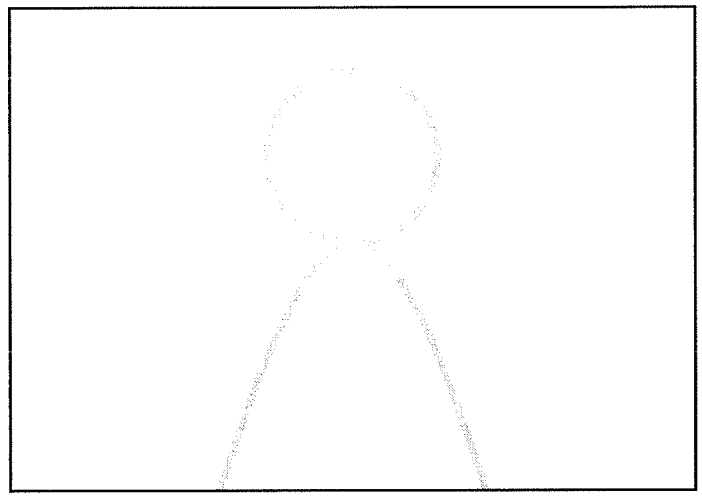
FIG. 32 schematically illustrates an example of a composite image.
Figure 33:
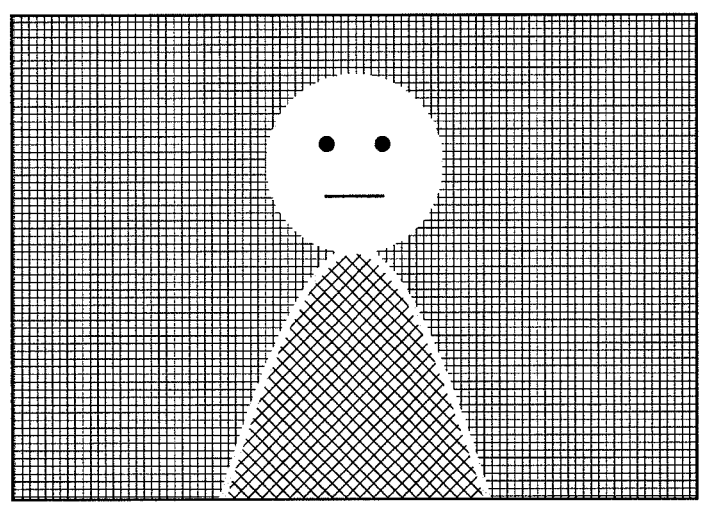
FIG. 33 schematically illustrates an example of a corrected image.

Next, with reference to FIGS. 31-33, a fourth embodiment of the present invention is explained. The components that are the same as in the first embodiment are not explained, but are referred to by the same reference numbers. The digital camera 100 of the fourth embodiment does not perform the first aberration correction process; a fourth aberration correction process is carried out instead. The fourth aberration correction process will be explained below.

The DSP 101 plays the roles of an image capturing processor and an image correction processor and carries out the fourth aberration correction process that corrects the fringes that emerge on a captured image. The fourth aberration correction process generates two images from a single captured image, produces a masking image from one of the two images, synthesizes the masking image with the other image to produce a composite image, and further synthesizes the composite image and the original image to correct the fringes.

Next, with reference to FIG. 31, the fourth aberration correction process is explained.

In the first Step S401, an object image, which is referred to as a captured image, is captured. The captured image is schematically illustrated in FIG. 20. Fringes 41 emerge on the outline of a person in the captured image. The process then proceeds to Steps S411, S412 and S415.

In Step S411, a correction image (the first processing image) is produced from the captured image. The correction image is generated by a process that includes a parameter(s) and that is able to suppress the saturation of the chrominance information. Accordingly, the fringes included in the captured image are suppressed. The process may include white balance, color matrix, gamma correction, a process to control the saturation or sharpness, and the like. The values of the parameters are selected to suppress the saturation. For example, the elements of the color matrix are adjusted to suppress color components that are prominent in the fringes. An example of the correction image is schematically illustrated in FIG. 21.

In Step S412, a detection image (the second processing image) is produced from the captured image. The detection image is generated by a process that includes a parameter(s) and that helps to detect the fringes. Accordingly, the fringes included in the captured image are enhanced by the process. The process may include white balance, color matrix, gamma correction, a process to control the saturation or sharpness, and the like. The values of the parameters are selected to facilitate the detection of the fringes. For example, the elements of the color matrix are adjusted to increase the saturation of colors within a specific range of wavelengths to enhance the colors that emerge on the fringes. An example of the detection image is schematically illustrated in FIG. 26. The fringes are accurately and effectively detected by enhancing the chromatic saturation within the specific wavelength range and further determining the saturated areas as fringe areas. Further, a fringe is also more easily determined by increasing the saturation even when the colors of the fringes resemble the color of an actual object.

In Step S413, the fringes in the detection image are detected and a masking image, from which the fringe areas are extracted, is produced. The masking image is schematically illustrated in FIG. 27. The masking image may be one of an aberration detected image or an aberration reduced image that are produced in the first aberration correction process.

In Step S414, the masking image is synthesized with the correction image. Thereby, a composite image, in which only the fringe areas of the correction image are extracted, is produced. This composite image is schematically illustrated in FIG. 32.

Step S415 is merely to indicate that the captured image is subjected to the following processes, but no process actually takes place in this step.

In Step S416, the composite image is synthesized with the captured image. Namely, a corrected image, in which the suppressed fringes are synthesized on the fringe areas of the captured image, is obtained. Thereby, the corrected image where the fringes are suppressed is obtained. The corrected image is schematically illustrated in FIG. 33.

According to the present embodiment, the same effects as the second and third embodiments are obtained. Further, the fringe areas are naturally corrected or synthesized by producing the composite image, in which only the fringe areas are extracted from the detection image and correction image.

Next, with reference to FIGS. 34-39, a fifth embodiment of the present invention is explained. The components that are the same as in the first embodiment are not explained, but are referred to by the same reference numbers. In the fifth embodiment, the DSP 101 performs an aberration area determining process to determine the aberration area illustrated in FIG. 2.

Figure 34:
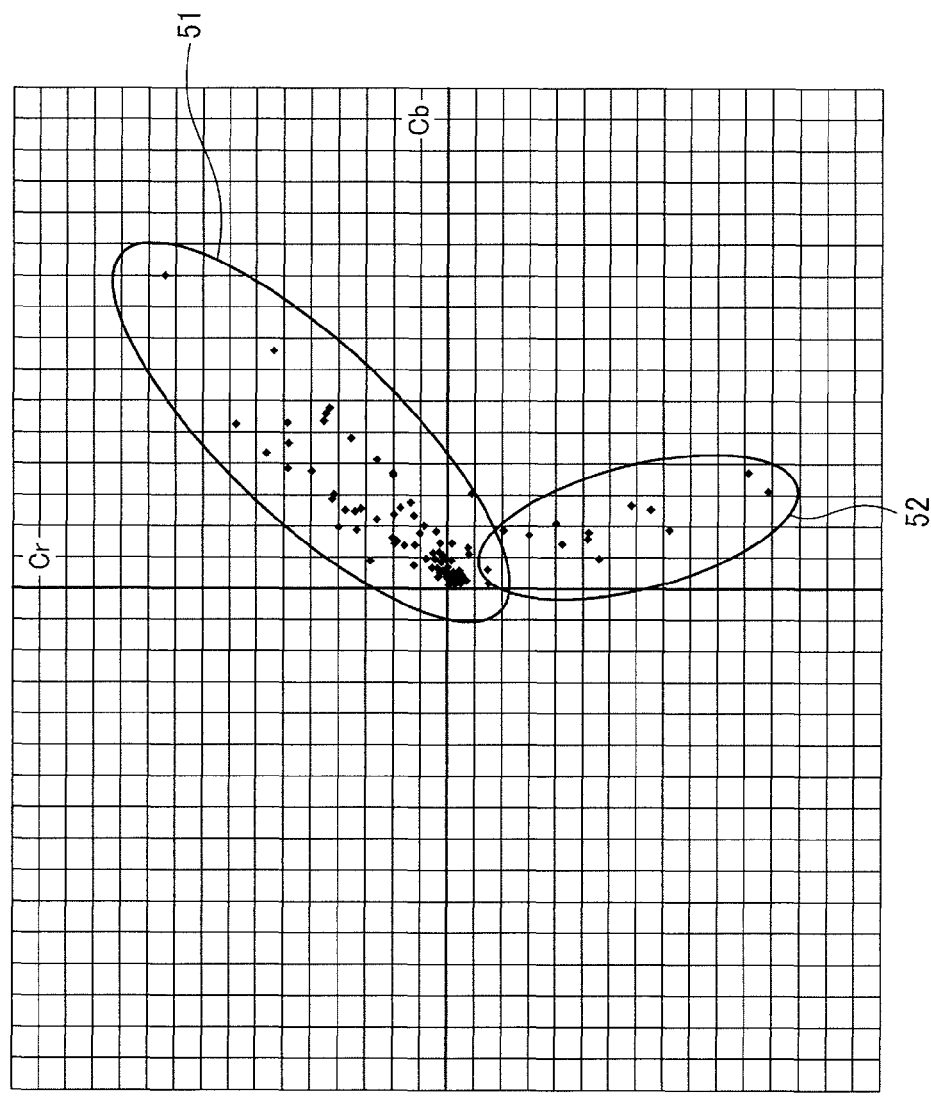
FIG. 34 is a graph indicating chrominance of fringes distributed on the CbCr plane.
Figure 35:
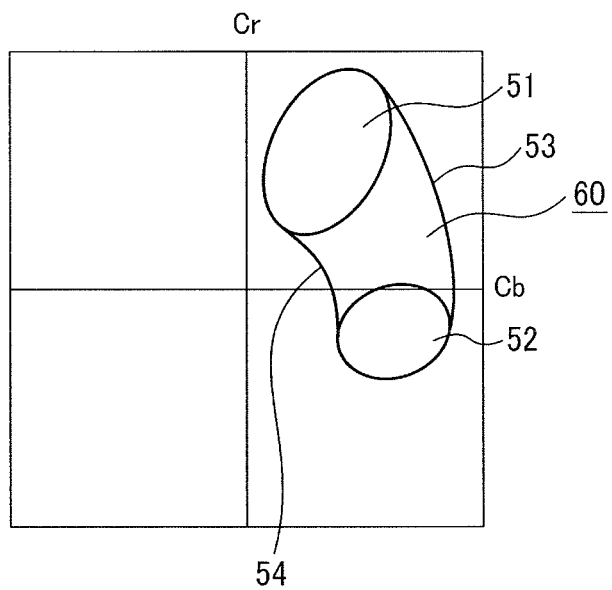
FIG. 35 is a graph indicating chrominance of fringes distributed on the CbCr plane.

FIG. 34 indicates color areas of fringes in a CbCr plane due to the photographic lens 102. The fringes indicated in FIG. 34 occur in the first quadrant and the fourth quadrant. A fringe in the first quadrant emerges when the focal point of the photographic lens 102 is behind a subject and includes purple and magenta colors. A fringe in the fourth quadrant emerges when the focal point of the photographic lens 102 is in front of a subject and includes green and blue colors.

The color area of the fringes in the first quadrant may be approximated by a first aberration area 51 having an oval shape. The color area of the fringes in the fourth quadrant may be approximated by a second aberration area 52 having an oval shape. The first aberration area 51 and the second aberration area 52 are defined by the parameters that determine the shape and the position of each ellipse. These parameters include at least one of the length of the major axis, the length of the minor axis, the central coordinates, and the inclination of the major axis.

However, some photographic lenses (102) produce a fringe that emerges in an intermediate area between the first aberration area 51 and the second aberration area 52. A measure to detect a fringe that emerges in the intermediate area is explained with reference to FIG. 35.

When the DSP 101 determines from the lens data that fringes would emerge in an area between the first aberration area 51 and the second aberration area 52, the intermediate area 60 is defined by describing arcs connecting the first aberration area 51 and the second aberration area 52. Namely, whether the chrominance (chromatic information) falls within the first aberration area 51, the second aberration area 52, or the intermediate aberration area 60 is determined. The intermediate aberration area 60 is defined by parameters. The parameters, which define the intermediate aberration area 60 are, for example, parameters that define the shapes and the positions of a first arc 53 and a second arc 54. The parameters may include one of the central coordinates of the arcs, the radius, diameter, and the central angle of the arcs. The first arc 53 and the second arc 54 connect the first aberration area 51 and the second aberration area 52.

On the other hand, in some cases, the fringes may be detected after applying predetermined image processing to the captured image. In such a case, the processing changes the chrominance (chromatic information) of the fringes so that the chrominance of the fringes may fall outside of the aberration area that is defined only from the lens data, and in turn, it may not be able to detect the fringes. Therefore, the following aberration area correction process may be carried out to enable detection of the fringes even after carrying out certain image processing on the captured image.

Figure 36:
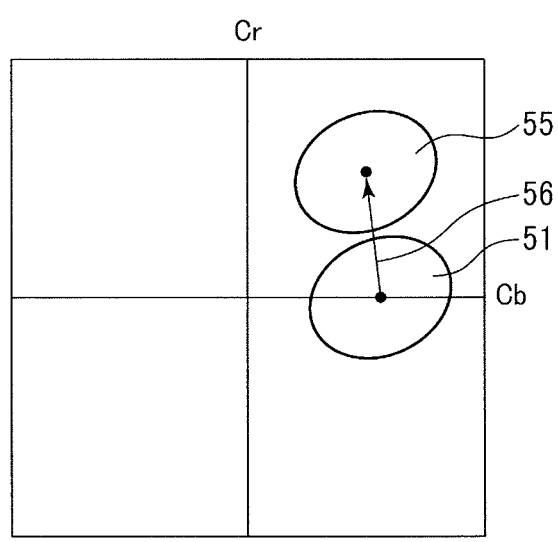
FIG. 36 is a graph indicating chrominance of fringes distributed on the CbCr plane.

An example of the aberration area correction process is explained with reference to drawings. FIG. 36 indicates an aberration area for detecting the fringes of a captured image when a white balance process is carried out.

The chrominance (chromatic coordinates) of the fringes that emerge in the captured image when the white balance is adjusted tend to be translated in the CbCr plane. Therefore, the fringes are detected using a translated aberration area. It is assumed that the first aberration area 51 is obtained from the lens data and that the aberration area is generally translated in a direction along a vector 56 when the white balance is carried out. The DSP 101 calculates the vector 56 to translate the first aberration area 51 on the basis of the vector 56, and obtains a third aberration area 55. In turn, it is determined whether the chrominance of each pixel in the captured image is within the third aberration area. Thereby, the fringes can be appropriately detected even after the white balance process is applied to the captured image.

Figure 37:
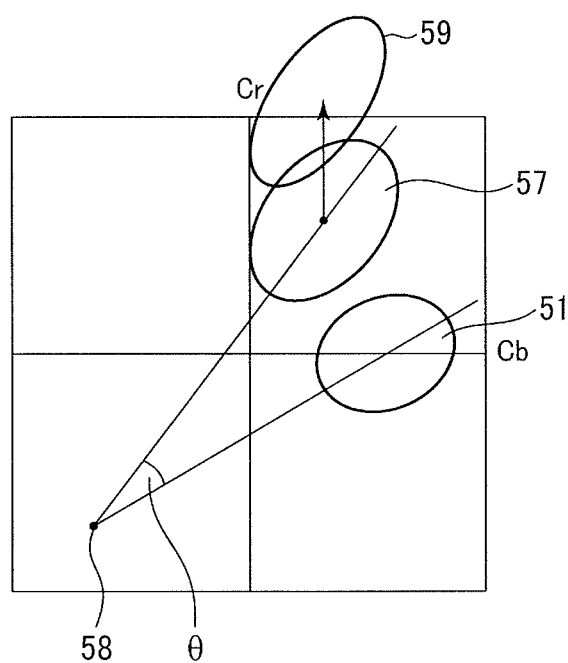
FIG. 37 is a graph indicating chrominance of fringes distributed on the CbCr plane.

FIG. 37 illustrates an aberration area that is used for detecting the fringes of the captured image when the color matrix is changed.

The chrominance (chromatic coordinates) of the fringes that emerge in the captured image generally rotates about a certain point in the CbCr plane when the color matrix is changed. Thus, the fringes are detected using a rotated aberration area. In FIG. 37, the first aberration area 51 is an area derived from the lens data. On the other hand, when the color matrix is changed, the aberration area is generally rotated about a rotation center 58 at an angle θ. Therefore, the DSP 101 calculates the rotation center 58 and the rotation angle θ and rotates the first aberration area 51 with respect to the rotation center 58 and the rotation angle θ to determine a fourth aberration area 57. Further, the DSP 101 determines whether or not the chrominance (chromatic coordinates) of each pixel of the captured image, in which the color matrix has been changed, is within the fourth aberration area 57. Thereby, the fringes can be appropriately detected even in a captured image where the color matrix is accommodated or changed.

Figure 38:
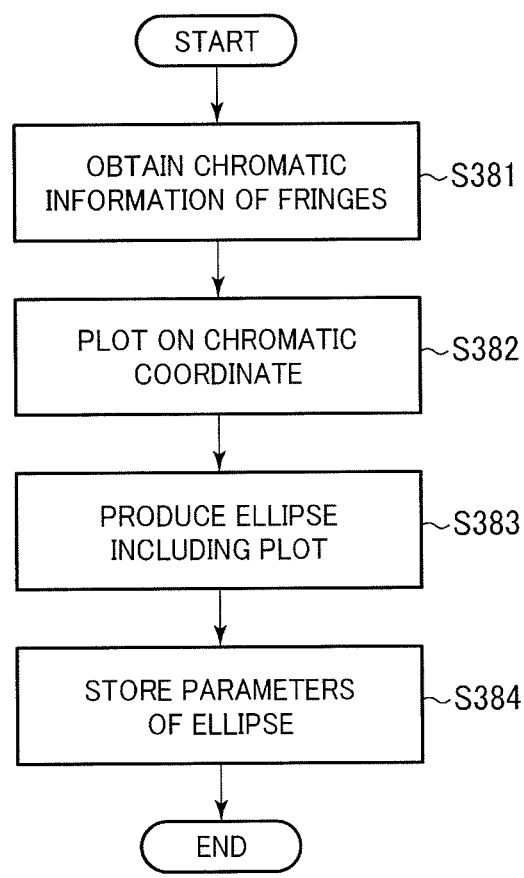
FIG. 38 is a flowchart of an aberration area determining process.

With reference to FIG. 38, the aberration area determining process is explained. The aberration area determining process is carried out when the photographic lens 102 is attached to the camera body 110.

In Step S381, the chrominance (chromatic coordinates) of the fringes is calculated from the lens data.

In Step S382, the chrominance calculated in Step S381 is plotted on the CbCr plane.

In Step S383, an ellipse including the chrominance plot from Step S382 is produced.

In Step S384, the geometric parameters of the ellipse produced in Step S383 are stored in the camera memory 103.

Figure 39:
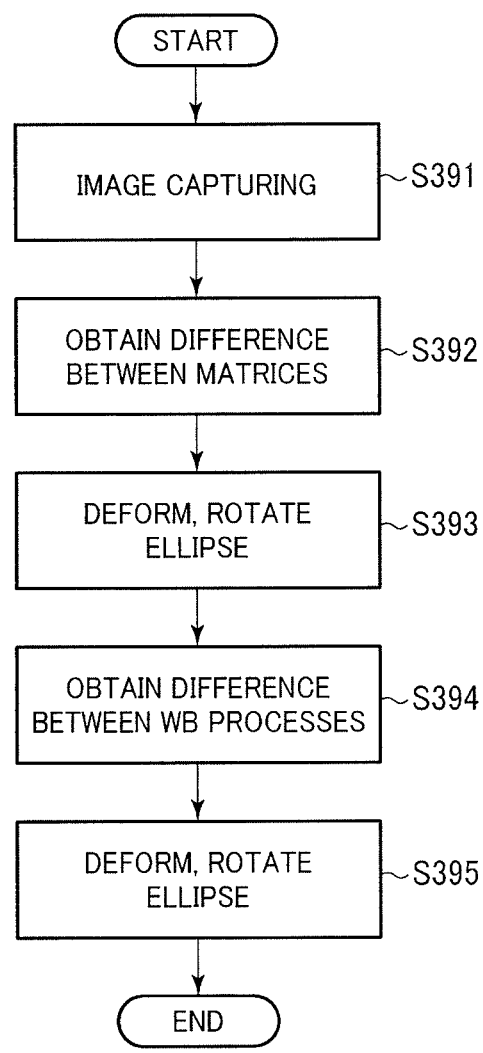
FIG. 39 is a flowchart of an aberration area correcting process.

With reference to FIGS. 37-39, the aberration area correcting process is explained. Here, the aberration area correcting process is carried out by the DSP 101 when the digital camera 100 captures an image.

In Step S391, a captured image is obtained.

In Step S392, the color matrix used when capturing the captured image and the color matrix used when producing the first aberration area 51 are compared and the difference between them is calculated.

In Step S393, the rotation center 58 and the rotation angle θ are calculated from the difference calculated in Step S392. The fourth aberration area 57 is then calculated by rotating the first aberration area 51 with reference to the rotation center 58 and the rotation angle θ.

In Step S394, the white balance process applied to the captured image and the white balance process applied when producing the first aberration area 51 are compared and the difference between them is calculated.

In Step S395, the vector 56 is calculated using the above difference calculated in Step S394. With reference to the vector 56, the fourth aberration area 57 is translated to obtain the fifth aberration area 59.

Thereby, the aberration area is corrected in accordance with the color matrix and the white balance process used in capturing the captured image so that the fringes are appropriately detected.

According to the present embodiment, the aberration area is approximated by an ellipse and parameters representing the shape and the position of the ellipse are recorded. Therefore, the amount of data required to be stored in a memory is decreased.

Further, even when the aberration area cannot be represented by an ellipse, the area can be approximated by the intermediate area 60, and parameters representing the shape and the position of the intermediate area 60 are recorded. Therefore, the amount of data required to be stored in a memory is decreased.

Further, the aberration area is changed according to image processing applied to a captured image so that the aberration can be detected accurately.

Note that the aberration area determining process and the aberration area correction process may be carried out beforehand by other devices using the lens data instead of the DSP 101. In such a case, the calculated parameters may be stored in the lens memory 108, which is provided in the photographic lens 102. The DSP 101 reads out the parameters from the lens memory 108 and detects the aberration on the basis of the parameters.

The parameters in the present embodiment may be calculated in advance using the lens data and may be stored in the lens memory 108, which is provided in the photographic lens 102. The DSP 101 reads out the parameters from the lens memory 108 and detects the aberration on the basis of the parameters.

The intermediate area 60, which exists between the first aberration area 51 and the second aberration area 52, may also be defined by segments and/or curves, such as quadratic curves, instead of the arcs.

Figure 40:
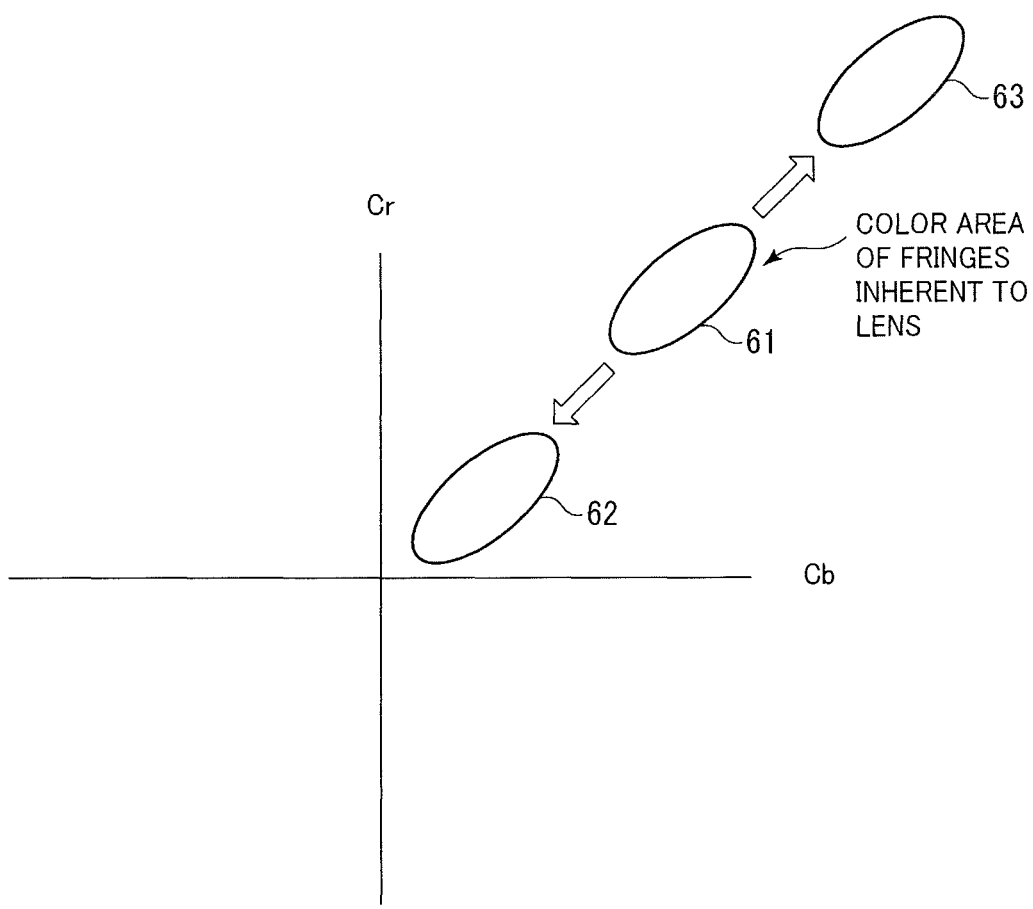
FIG. 40 is a graph indicating chrominance of fringes distributed on the CbCr plane.

Next, with reference to FIG. 40, a sixth embodiment of the present invention is explained. The components that are the same as in the first to fifth embodiments are not explained, but are referred to by the same reference number. In the sixth embodiment, the measures to produce the correction image and the detection image are different from any of the second, third and fourth aberration correction processes. Hereinafter, the measures for producing the correction image and the detection image are explained.

In the present embodiment, the correction image and the detection image are produced by using the lens data. FIG. 40 indicates an aberration area 61 on the CbCr plane, which is calculated from the lens data.

First, a measure to produce the correction image is explained. The DSP 101 first calculates the aberration area 61, indicated in FIG. 40, from the lens data. Next, pixels including the chrominance within the aberration area 61 are extracted from the captured image. The saturation of the chrominance of the extracted pixels is then decreased. More specifically, the chromatic coordinates on the CbCr plane are translated toward the origin. Namely, the chrominance of the pixels in the aberration area 61 is moved to an area 62. Thereby, only the saturation of the fringes in the captured image is reduced so that the fringe is suppressed. FIG. 21 schematically illustrates the correction image.

Next, a measure for producing the detection image is explained. The DSP 101 first calculates the aberration area 61, indicated in FIG. 40, from the lens data. Next, pixels including the chrominance within the aberration area 61 are extracted from the captured image. The saturation of the chrominance of the extracted pixels is then increased. More specifically, the chromatic coordinates on the CbCr plane are translated radially away from the origin. Namely, the chrominance of the pixels in the aberration area 61 is moved to an area 63. Thereby, only the saturation of the fringes in the captured image is increased so that the fringe is enhanced. FIG. 26 schematically illustrates the detection image.

The fringes may also be suppressed by changing the color matrix instead of controlling the saturation. Hereinafter, a measure that produces the correction image by changing the color matrix is explained.

The DSP 101 first calculates the aberration area 61, indicated in FIG. 40, from the lens data. Next, when the aberration area 61 exists, such that when a fringe exists, the chromatic information (chromatic coordinates) of the captured image is transformed into the RGB space so that the information in the RGB values is obtained. Further, the RGB values are converted by the following Eq. (1).

$$\begin{pmatrix} R' \\ G' \\ B' \end{pmatrix} = \begin{pmatrix} 1 & 0.06 & -0.06 \\ 0 & 0.93 & 0.07 \\ 0 & 0.2 & 0.8 \end{pmatrix} \begin{pmatrix} R \\ G \\ B \end{pmatrix} \quad (1)$$

Eq. (1) suppresses the blue color that is prominent in the fringes. Namely, the fringes are suppressed by Eq. (1).

On the other hand, when the aberration area 61 does not exist, such that when a fringe does not exist, the RGB values are converted by the following Eq. (2).

$$\begin{pmatrix} R' \\ G' \\ B' \end{pmatrix} = \begin{pmatrix} 1 & 0 & 0 \\ 0 & 1 & 0 \\ 0 & 0 & 1 \end{pmatrix} \begin{pmatrix} R \\ G \\ B \end{pmatrix} \quad (2)$$

Eq. (2) multiplies the RGB values by the unit matrix, which does not change the RGB values.

In the present embodiment, only the fringes are suppressed or enhanced by using the lens data.

Note that instead of decreasing the saturation of the pixels having chrominance within the aberration area 61, the sharpness of areas comprised of pixels having the chrominance within the aberration area 61 may be reduced to produce the correction image. Thereby, the fringes are suppressed. Similarly, instead of increasing the saturation of the pixels having chrominance within the aberration area 61, the sharpness of areas comprised of pixels having the chrominance within the aberration area 61 may be increased to produce the correction image. Thereby, the fringes are enhanced.

Further, Eq. (1) may be applied to a pixel having the chrominance within the aberration area 61 while applying Eq. (2) to a pixel having the chrominance beyond the aberration area 61 when producing the correction image by changing the color matrix. Here, the DSP 101 calculates the aberration area 61, which is illustrated in FIG. 40, with reference to the lens data. Next, pixels having the chrominance within the aberration area 61 are extracted from the captured image. The RGB information, which is calculated by converting the chromatic information of the extracted pixels into RGB values in the RGB color space, is then obtained. Further, the RGB values are transformed by Eq. (1). By using Eq. (1), the fringes are suppressed. On the other hand, the RGB values of the pixels having the chrominance outside of the aberration area 61 are transformed by Eq. (2).

Further, Eq. (1) is only an example of the conversion and the conversion is not limited thereto, so that if fringes include other colors, such as green or magenta, another matrix may be used.

Note that images detailed in the embodiments, including the captured image, do not have to be represented by a YCbCr space and may also be represented by another color system.

In any of the embodiments, the lens data may also be recorded in each captured image. Namely, detection and correction of the fringes may be carried out in a personal computer by acquiring the lens data from the captured image. Further, other data, which are used in the detection of the aberration, may also be recorded in a captured image. A personal computer may detect and correct the fringes of a captured image by acquiring these data from the captured image.

In any of the embodiments, the lens data may be stored in the photographic lens 102, but also may be stored in the digital camera 100 by storing lens data corresponding to each different type of photographic lens.

The lens data of an individual photographic lens may be recorded instead of the lens data corresponding to each type of photographic lens. In such a case, the fringes are more accurately detected and corrected.

Further, in any of the embodiments, the photographic lens 102 may also be integrated into the camera body 110. Namely, the digital camera 100 may be a compact digital camera.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2013-225896 (filed on Oct. 30, 2013) and Japanese Patent Application No. 2013-226023 (filed on Oct. 30, 2013), which are expressly incorporated herein, by reference, in their entireties.

The invention claimed is:

1. An image-processing system, comprising:
an imaging processor that obtains a captured image; and
a correction processor that produces a corrected image by correcting an aberration that emerges in the captured image;
the correction processor performing processes of:
producing at least two processed images by applying different processes to the captured image;
producing a masking image by applying a predetermined process to a single image of either the captured image or one of the at least two processed images;
producing a composite image by synthesizing the masking image and an other one of either the captured image or one of the at least two processed images, which is not used in producing the masking image, each of the images synthesized in producing the composite image originating from a single image; and
producing the corrected image by synthesizing the composite image and the captured image.

2. The image-processing system according to claim 1, wherein the correction processor further performs processes of:
producing a first processed image that is obtained by applying a first process to the captured image;
producing the masking image by applying the predetermined process to the captured image; and
producing the composite image by synthesizing the first processed image and the masking image.

3. The image-processing system according to claim 1, wherein the correction processor further performs processes of:
producing a second processed image that is obtained by applying a second process to the captured image;
producing the masking image by applying a predetermined process to the second processed image; and
producing a third processed image that is obtained by applying a third process to the captured image; and
producing the composite image by synthesizing the third processed image and the masking image.

4. The image-processing system according to claim 1, wherein the correction processor further performs processes of:
producing a first processed image that is obtained by applying a first process to the captured image;
producing a second processed image that is obtained by applying a second process to the captured image;
producing the masking image by applying a predetermined process to the second processed image; and
producing the composite image by synthesizing the first processed image and the masking image.

5. An imaging apparatus comprising:
an imaging sensor that captures an captured image; and
a correction processor that produces a corrected image by correcting an aberration that emerges in the captured image;
the correction processor performing processes of:
producing at least two processed images obtained by applying different processes to the captured image;
producing a masking image by applying a predetermined process to a single image of either the captured image or one of the at least two processed images;
producing a composite image by synthesizing the masking image and an other one of either the captured image or one of the at least two processed images, which is not used in producing the masking image, each of the images synthesized in producing the composite image originating from a single image; and
producing the corrected image by synthesizing the composite image and the captured image.

6. The image-processing system according to claim 1, wherein the captured image is obtained via a photographic lens and the at least two processed images are is produced by applying different processes to the captured image with reference to design data of the photographic lens.

7. The image-processing system according to claim 6, wherein the correction processor further performs processes of:
producing a first processed image that is obtained by applying a first process to the captured image using the design data of the photographic lens;
producing the masking image by applying the predetermined process to the captured image; and
producing the composite image by synthesizing the first processed image and the masking image.

8. The image-processing system according to claim 6, wherein the correction processor further performs processes of:

producing a second processed image that is obtained by applying a second process to the captured image;

producing the masking image by applying a predetermined process to the second processed image; and producing a third processed image that is obtained by applying a third process to the captured image; and producing the composite image by synthesizing the third processed image and the masking image.

9. The image-processing system according to claim 6, wherein the correction processor further performs processes of:

producing a first processed image that is obtained by applying a first process to the captured image;

producing a second processed image that is obtained by applying a second process to the captured image;

producing the masking image by applying a predetermined process to the second processed image; and producing the composite image by synthesizing the first processed image and the masking image.

10. An imaging apparatus comprising:

an imaging sensor that captures a captured image; and a correction processor that produces a corrected image by correcting an aberration that emerges in the captured image;

the correction processor performing processes of:

producing at least two processed images obtained by applying different processes to the captured image with reference to design data of the photographic lens;

producing a masking image by applying a predetermined process to a single image of either the captured image or one of the at least two processed images;

producing a composite image by synthesizing the masking image and an other one of either the captured image or one of the at least two processed images, which is not used in producing the masking image, each of the images synthesized in producing the composite image originating from a single image; and producing the corrected image by synthesizing the composite image and the captured image.

11. The image-processing system according to claim 1, wherein the masking image masks areas other than a fringe in the captured image, the fringe being caused by the aberration that emerges when processing image signals from an image sensor.

* * * * *